US007471827B2

(12) United States Patent
Xie et al.

(10) Patent No.: US 7,471,827 B2
(45) Date of Patent: Dec. 30, 2008

(54) AUTOMATIC BROWSING PATH GENERATION TO PRESENT IMAGE AREAS WITH HIGH ATTENTION VALUE AS A FUNCTION OF SPACE AND TIME

(75) Inventors: Xing Xie, Beijing (CN); Wei-Ying Ma, Beijing (CN); Hong-Jiang Zhang, Beijing (CN); Liu Hao, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 10/688,471

(22) Filed: Oct. 16, 2003

(65) Prior Publication Data

US 2005/0084136 A1 Apr. 21, 2005

(51) Int. Cl.
*G06K 9/34* (2006.01)
(52) U.S. Cl. .............. 382/173; 382/164; 382/195; 345/419
(58) Field of Classification Search .......... 382/107, 382/115–161, 190–208; 345/419, 629
See application file for complete search history.

(56) References Cited

U.S. PATENT DOCUMENTS

| 5,442,633 A | 8/1995 | Perkins et al. |
| 5,497,430 A | 3/1996 | Sadovnik et al. |
| 5,530,883 A | 6/1996 | Moore et al. |
| 5,530,963 A | 6/1996 | Moore et al. |
| 5,625,877 A | 4/1997 | Dunn et al. |
| 5,642,294 A | 6/1997 | Taniguchi et al. |
| 5,659,685 A | 8/1997 | Williams et al. |
| 5,710,560 A | 1/1998 | Cohn |
| 5,745,190 A | 4/1998 | Ioka |
| 5,751,378 A | 5/1998 | Chen et al. |
| 5,774,593 A | 6/1998 | Zick et al. |
| 5,778,137 A | 7/1998 | Nielsen et al. |
| 5,801,765 A | 9/1998 | Gothoh et al. |
| 5,835,163 A | 11/1998 | Liou et al. |

(Continued)

FOREIGN PATENT DOCUMENTS

EP 0597450 5/1994

(Continued)

OTHER PUBLICATIONS

Peter Pirolli, "Exploring Browser Design Trade-offs Using a Dynamical Model of Optimal Information Foraging", 1998, Proc. SIGCHI conference on Human factors in computing systems CHI '98, ACM Press, pp. 33-40.*

(Continued)

*Primary Examiner*—Samir A Ahmed
*Assistant Examiner*—Clifton G Daley
(74) *Attorney, Agent, or Firm*—Lee & Hayes, PLLC

(57) ABSTRACT

Systems and methods for automatic generation of a browsing path across image content to present areas with high attention value are described. In particular, an image is modeled via multiple visual attentions to create a respective set of attention objects for each modeled attention. The attention objects and their respective attributes are analyzed to generate a browsing path to select ones of the attention objects. The browsing path is generated to optimize the rate of information gain from the attention objects as a function of information unit cost in terms of time constraints associated with multiple image browsing modes.

32 Claims, 9 Drawing Sheets

U.S. PATENT DOCUMENTS

| | | |
|---|---|---|
| 5,884,056 A | 3/1999 | Steele |
| 5,900,919 A | 5/1999 | Chen et al. |
| 5,901,245 A | 5/1999 | Warnick et al. |
| 5,911,008 A | 6/1999 | Niikura et al. |
| 5,920,360 A | 7/1999 | Coleman, Jr. |
| 5,952,993 A | 9/1999 | Matsuda et al. |
| 5,959,697 A | 9/1999 | Coleman, Jr. |
| 5,983,273 A | 11/1999 | White et al. |
| 5,990,980 A | 11/1999 | Golin |
| 5,995,095 A | 11/1999 | Ratakonda |
| 6,047,085 A | 4/2000 | Sato et al. |
| 6,100,941 A | 8/2000 | Dimitrova et al. |
| 6,166,735 A | 12/2000 | Dom et al. |
| 6,168,273 B1 | 1/2001 | Dupraz et al. |
| 6,182,133 B1 | 1/2001 | Horvitz |
| 6,232,974 B1* | 5/2001 | Horvitz et al. ............... 345/419 |
| 6,282,317 B1 | 8/2001 | Luo et al. |
| 6,292,589 B1 | 9/2001 | Chow et al. |
| 6,353,824 B1* | 3/2002 | Boguraev et al. ............... 707/5 |
| 6,408,128 B1 | 6/2002 | Abecassis |
| 6,421,675 B1 | 7/2002 | Ryan et al. |
| 6,462,754 B1 | 10/2002 | Chakraborty et al. |
| 6,466,702 B1 | 10/2002 | Atkins et al. |
| 6,473,778 B1 | 10/2002 | Gibbon |
| 6,622,134 B1 | 9/2003 | Sorkin |
| 6,643,643 B1 | 11/2003 | Lee et al. |
| 6,643,665 B2 | 11/2003 | Kimbell et al. |
| 6,658,059 B1 | 12/2003 | Iu et al. |
| 6,670,963 B2* | 12/2003 | Osberger ............... 345/629 |
| 6,714,909 B1 | 3/2004 | Gibbon et al. |
| 6,773,778 B2 | 8/2004 | Onozawa et al. |
| 6,792,144 B1 | 9/2004 | Yan et al. |
| 6,807,361 B1 | 10/2004 | Girgensohn et al. |
| 6,870,956 B2 | 3/2005 | Qi et al. |
| 6,934,415 B2 | 8/2005 | Stentiford |
| 7,065,707 B2 | 6/2006 | Chen et al. |
| 7,248,294 B2* | 7/2007 | Slatter ............... 348/240.99 |
| 2001/0023450 A1 | 9/2001 | Chu |
| 2002/0157116 A1 | 10/2002 | Jasinschi |
| 2002/0166123 A1 | 11/2002 | Schrader et al. |
| 2003/0033347 A1 | 2/2003 | Bolle et al. |
| 2003/0123850 A1 | 7/2003 | Jun et al. |
| 2003/0152363 A1 | 8/2003 | Jeannin et al. |
| 2003/0152383 A1 | 8/2003 | Jeannin et al. |
| 2003/0210886 A1 | 11/2003 | Li et al. |
| 2003/0237053 A1 | 12/2003 | Chen et al. |
| 2004/0040041 A1 | 2/2004 | Crawford |
| 2004/0068481 A1 | 4/2004 | Seshadri et al. |
| 2004/0078357 A1 | 4/2004 | LaChapelle et al. |
| 2004/0078382 A1 | 4/2004 | Mercer et al. |
| 2004/0078383 A1 | 4/2004 | Mercer et al. |
| 2004/0085341 A1 | 5/2004 | Hua et al. |
| 2004/0088726 A1 | 5/2004 | Ma et al. |
| 2004/0165784 A1 | 8/2004 | Xie et al. |
| 2004/0184776 A1 | 9/2004 | Inoue et al. |
| 2006/0239844 A1 | 10/2006 | Barbien |
| 2007/0027754 A1 | 2/2007 | Collins et al. |
| 2007/0060099 A1 | 3/2007 | Ramer et al. |

FOREIGN PATENT DOCUMENTS

| | | |
|---|---|---|
| EP | 1 168 840 | 1/2002 |
| EP | 1 168 840 A2 | 1/2002 |
| EP | 1 123 915 A2 | 6/2002 |
| EP | 1 213 915 | 6/2002 |
| GB | 2 356 080 | 5/2001 |
| GB | 2 358 080 A | 5/2001 |
| KR | 20020009089 A | 2/2002 |
| KR | 20040042449 A | 5/2004 |
| WO | WO0028467 A1 | 5/2000 |

OTHER PUBLICATIONS

John Smith et al. "Scalable Multimedia Delivery for Pervasive Computing", ACM Multimedia, 1999 ACM, pp. 131-140.*

Adams, et al., "Seeded Region Growing", IEEE, vol. 16, No. 6, 1994, pp. 641-648.

Alexander, et al., "Informedia: News-on-Demand Multimedia Information Acquisition and Retrieval", 1997, pp. 1-21.

DeMenthon, et al., "Video Summarization by Curve Simplification", ACM, 1998, pp. 211-218.

Gong, et al., "Creating Motion Video Summaries with Partial Audio-Visual Alignment", IEEE, 2002, pp. 285-288.

Goncalves, "Towards a Learning Model for Feature Integration in Attention Control", retrieved on Jul. 19, 2006 at <<http://ieeexplore.ieee.org/search/srchabstract.jsp?arnumber=1013553&isnumber=21824&pun>>, International Conference on Multisensor Fusion and Integration for Intelligent Systems, Aug. 20-22, 2001, pp. 311-316.

Osberger, et al., "An Automatic Image Quality Assessment Technique Incorporating Higher Level Perceptual Factors", retrieved on Jul. 19, 2006, at <<http://ieeexplore.ieee.org/search/srchabstactjsp?arnumber727227&isnumber==15680&punu>>, International Conference on Image Processing, vol. 3, Oct. 4-7, 1998, pp. 414-418.

Fan et al., "Visual Attention Based Image Browsing on Mobile Devices" 4 pages.

Zadeh, L.A. "Probability Measures of Fuzzy Events" Journal of Mathematical Analysis and Applications, 23, 1968, pp. 421-427.

Wolfe, J.M., "Developing Visual Attention: The Guided Search Model" Al and the Eye Chapter 4, 1990, pp. 79-103.

Tsotsos, J.K. et al., "Modeling Visual Attention Via Selective Tuning" Artifical Intelligence v78, 1995, pp. 507-545.

Nieber et al., "Computational Architectures for Attention" The Attentive Brain Chapter 9, pp. 163-186.

Held, Gilbert, "Focus on Agere System's Orinoco PC Card" International Journal of Network Management, Jan. 2002, pp. 187-193.

Deng, et al., "Peer Group Filtering and Perceptual Color Image Quantization" Proceedings of IEEE International Symposium on Circuits and Systems, v4, 1999, pp. 21-24.

Zabih, Ramin, "A Feature-Based Algorithm for Detecting and Classifying Scene Breaks" Computer Science Department, Cornell University, 16 pages.

Lienhart et al., "On the Detection and Recognition of Television Commercials" University of Mannheim, 17 pages.

Hargrove, Thomas, "Logo Detection in Digital Video" Math 100, Mar. 6, 2001 http://toonarchive.com/logo-detection/, 9 pages.

htpp://www.fatalfx.com/nomad/ "NOMAD (No More Advertising)" Feb. 17, 2003, 4 pages.

Sadlier, David, "Automatic TV Advertisement Detection from MPEG Bitstream" Centre for Digital Video Processing/Research Institute for Network & Communication Eng., Dublin City University, 12 pages.

Sanchez, Juan Maria, "AudiCom: A Video Analysis System for Auditing Commercial Broadcasts" Computer Vision Department d'Informatica Univerisitat Autonoma de Barcelona, 5 pages.

Lu, Lie et al., "A Robust Audio Classification and Segmentation Method" Microsoft Research, China, 9 pages.

Lu Lie et al., "Content Analysis for Audio Classification and Segmentation" IEEE, Transactions on Speech and Audio Processing, v10, No. 7, Oct. 2002, pp. 504-516.

Lu Lie et al., "Content-Based Audio Segmentation Using Support Vector Machines" IEEE, 2001, pp. 956-959.

Jha, Uma S., "Wireless Landscape-Need for Seamless Connectivity" Wireless Personal Communications, 2002, pp. 275-283.

Cherry, Steven, "Pesky Home Networks Trouble.cable Behemoths" IEEE Spectrum, Apr. 2002, pp. 60-61.

Sahoo et al., "Threshold Selection Using a Minimal Histogram Entropy Difference" Optical Engineering, v36, No. 7 Jul. 1997, pp. 1976-1981.

Milanese, et al., "Attentive Mechanisms for Dynamic and Static Scene Analysis" Optical Engineering v34, No. 8, Aug. 1995, pp. 2428-2434.

Jing et al., "An Effective Region-Based Image Retrieval Framework" From ACM Multimedia 2002, 28 pages.

Li, et al., Statistical Learning of Multi-View Face Detection Proceedings of ECCV 2002, 25 pages.

Ahmed, S., "Visit: A Neural Model of Covert Visual Attention" Advances in Neural Information Processing Systems, v4, 1991, pp. 420-427.

Baluja et al., "Expectation-Based Selective Attention for Visual Monitoring and Control of a Robot Vehicle" Robotics and Autonomous System v22, No. 3-4, Dec. 1997, pp. 329-344.

Ma, et al., "A User Attention Model for Video Summarization" Proceedings of ICIP, 2002.

Chen, et al., "A Visual Attention Model for Adapting Images on Small Displays" ACM Multimedia Systems Journal, 2003.

Yusoff, et al., "Video Shot Cut Detection Using Adaptive Tresholding" University of Surrey, 2000, pp. 1-10.

Lelescu, et al., "Real-time Scene Change Detection on Compressed Multimedia Bitstream Based on Statistical Sequential Analysis" IEEE, 2000, pp. 1141-1144.

Heng, et al., "Post Shot Boundary Detection Technique: Flashlight Scene Determination" University of Western Australia, 1999, pp. 447-450.

O'Toole, "An MPEG-1 Shot Boundary Detector Using XIL Colour Histograms" Dublin City University, 1998, pp. 1-7.

Gamaz et al., "Robust scene-change detection in MPEG compressed domain" Electrical & Computer Engineering, 1998, pp. 95-99.

Gu, et al., "Dissolve Detection in MPEG Compressed Video" IEEE, 1997, pp. 1692-1696.

Yeo, et al., "Rapid Scene Analysis on Compressed Video" IEEE, 1995, pp. 533-544.

Divakaran, et al., "Video Summarization Using Descriptors of Motion Activity: A Motion Activity Based Approach to Key-Frame Extraction From Video-Shots" Journal of Electronic Imaging, Oct. 2001, v10 No. 4 pp. 909-916.

Ahmad, Subutai; "Visit: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous Systems, v. 22 No. 3-4, Dec. 1997, pp. 329-344.

Chen et al.; "A Visual Attention Model for Adapting Images on Small Displays" ACM Multimedia Systems Journal, 2003.

Cherry, Steven M., "Pesky Home Networks Trouble cable Behemoths" IEEE Spectrum, Apr. 2002, pp. 60-61.

Deng et al.;"Peer Group Filtering and Perceptual Color Image Quantization" Proceedings of IEEE International Symposium on Circuits and Systems, vol. 4, 1999, pp. 21-24.

Gamaz et al.; "Robust scene-change detection in MPEG compressed domain" Electrical & Computer Engineering, 1998, pp. 95-99.

Gu et al.; "Dissolve Detection in MPEG Compressed Video" IEEE, 1997, pp. 1692-1696.

Hargrove, Thomas; "Logo Detection in Digital Video" Math 100, Mar. 6, 2001 http://toonarchive.com/logo-detection/, 9 pages.

Held, Gibert; "Focus on Agere System's Orinoco PC Card" International Journal of Network Management, Jan. 2002, pp. 187-193.

http://www.fatalfx.com/nomad/ "NOMAD (No More Advertising)" Feb. 17, 2003, 4 pages.

Divakaran et al.; "Video Summarization Using Descriptors of Motion Activity: A Motion Activity Based Approach to Key-Frame Extraction from Video Shots" Journal of Electronic Imaging, Oct. 2001, vol. 10 n 4, pp. 909-916.

Heng et al.; "Post Shot Boundary Detection Technique: Flashlight Scene Determination" University of Western Australia, 1999, pp. 447-450.

Jha, Uma S.; "Wireless Landscape-Need for Seamless Connectivity" Wireless Personal Communications 2002 pp. 275-283.

Jing et al.; "An Effective Region-Based Image Retrieval Framework" From ACM Multimedia, 2002, 28 pages.

Lelescu et al.; "Real-time Scene Change Detection on Compressed Multimedia Bitstream Based on Statistical Sequential Analysis" IEEE, 2000, pp. 1141-1144.

Li et al.; "Statistical Learning of Multi-View Face Detection" Proceedings of ECCV, 2002, 25 pages.

Lienhart, R. et al.; "On the Detection and Recognition of Television Commercials" University of Mannheim, 17 pages.

Lu; Lie et al.; "A Robust Audio Classification and Segmentation Method" Microsoft Research, China, 9 pages.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Ma et al.; "A User Attention Model for Video Summarization" Proceedings of ICIP, 2002.

Milanese R. et al.; "Attentive Mechanisms for Dynamic and Static Scene Analysis" Optical Engineering, v34 No. 8, Aug. 1995, pp. 2428-2434.

Niebur, E. et al.; "Computational Architectures for Attention" The Attentive Brain, Chapter 9, 1998, pp. 163-186.

O'Toole; "An MPEG-1 Shot Boundary Detector Using XIL Colour Histograms" Dublin City University, 1998, pp. 1-7.

Sadlier, David A.; "Automatic TV Advertisement Detection from MPEG Bitstream" Centre for Digital Video Processing/Research Institute for Network & Communication Eng., Dublin City University, 12 pages.

Sahoo P.K. et al.; "Threshold Selection Using a Minimal Histogram Entropy Difference" Optical Engineering, v36 No. 7, Jul. 1997, pp. 1976-1981.

Sanchez, Juan Maria; "AudiCom: A Video Analysis System for Auditing Commercial Broadcasts" Computer Vision Center Department d'Informatica Universitat Autonoma de Barcelona, 5 pages.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Zabih, Ramin; "A Feature-Based Algorithm for Detecting and Classifying Scene Breaks" Computer Science Department, Cornell University, 16 pages.

Zadeh L. A.; "Probability Measures of Fuzzy Events" Journal of Mathematical Analysis and Applications, 23, 1968, pp. 421-427.

U.S. Appl. No. 10/286,053 filed Nov. 1, 2002, Inventors Yu-Fei Ma, et al. Entitled "Systems and Methods for Gernerating a comprehensive User Attention Model".

U.S. Appl. No. 10/371,125 filed Feb. 20, 2003, Inventors Wei-Ying Ma, et al. Entitled "Systems and Methods for Enhanced Image Adaptation".

Lee, Keansub,et al.; "Perception-Based Image Transcoding for Universal Multimedia Access"; School of Electrical Engineering Korea University, Seoul, Korea, 2001 IEEE, pp. 475-478.

M.A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang ,"A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

U.S. Appl. No. 10/179,161, filed Jun. 24, 2002, inventors Jin-Lin Chen & Wei-Ying Ma, entitled "Function-based Object Model for Web Page Display in a Mobile Device."

U.S. Appl. No. 10/286,348, filed Nov. 1, 2002, inventors Xian-Sheng Hua et al., entitled "Systems and Methods for Automatically Editing a Video."

U.S. Appl. No. 10/285,933, filed Nov. 1, 2002, inventors Yu-Fei Ma et al., entitled "Systems and Methods for Generating a Motion Attention Model."

Beg, "User Feedback Based Enchancement in Web Search Quality", Elsevier Science Inc., Feb. 2005, vol. 170, pp. 20.

Bennett, et al., "Proscenium: A Framework for Spatio-Temporal Video Editing", Nov. 2-3, 2003, ACM, 2003, Berkeley, pp. 8.

Degn, et al., "Peer Group Filterig and Perceptual Color Image Quantization", vol. 4, IEEE, Jul. 1999, pp. 4.

Fan, et al., "Visual Attention Based Image Browsing On Mobile Devices", IEEE Computer Society 2003, vol. 2, pp. 4.

Foote, et al., "Creating Music Videos using Automatic Media Analysis", ACM 2002, pp. 8.

Girgensogn, et al., "Home Video Editing Made Easy—Balancing Automation and User Control", 2001, pp. 8.

Graham, et al., "The Video Paper Multimedia Playback System", ACM, Nov. 2-8, 2003, pp. 2.

Hua, et al., "Automatically Converting Photographic Series into Video", Oct. 10-16, 2004, ACM, 2004, pp. 8.

Hua, et al., "AVE—Automated Home Video Editing", Nov. 2-8, 2003, ACM, pp. 8.

Hua, et al., "Video Booklet", Jul. 6-8, 2005, IEEE, 2005, pp. 4.

Kelly, et al., "Implicit Feedback for Inferring User Preference: A Bibliography", SIGIR Forum, vol. 32, No. 2, 2003, pp. 18-28.

"NOMAD (No More Advertising)", retrieved on Jun. 28, 2004, at <<http://www.fatalfx.com/nomad/>>, pp. 1-4.

Sugiyama, et al., "Adaptive Web Search Based on Users Implicit Preference", ACM, 2004, pp. 8.

Yip, et al., "The Automatic Video Editor", Nov. 2-8, 2003, ACM, pp. 2.

PCT Search Report patent application No. 2006-049090 mailed on Jul. 13, 2007, pp. 7.

Girgensogn et al., "A Semi-automatic Approach to Home Video Editing", ACM, UIST 2000, 9 pgs.

"Advanced Digital Video Storage and On-line Retrieval System", Advisor Project, Jun. 30, 2002, retrieved from the Internet http://advisor.matrasi-tis.fr/DUP_workshop_sheet.pdf.

Zhang et al., "A Hierarchical Organization Scheme for Video Data" Pattern Recognition, Elsevier, Kidlington, GB, vol. 35 No. 11, Nov. 2002, pp. 2381-2387.

* cited by examiner

AUTOMATIC BROWSING PATH GENERATION TO PRESENT IMAGE AREAS WITH HIGH ATTENTION VALUE AS A FUNCTION OF SPACE AND TIME

RELATED APPLICATIONS

This patent application is related to:

U.S. patent application Ser. No. 10/286,053, titled "Systems and Methods for Generating a Comprehensive User Attention Model", filed on Nov. 1, 2002, commonly assigned herewith, and hereby incorporated by reference;

U.S. patent application Ser. No. 10/371,125, titled "Systems and Methods for Enhanced Image Adaptation", filed on Feb. 20, 2003, commonly assigned herewith, and hereby incorporated by reference.

TECHNICAL FIELD

The invention pertains to presenting an image presentation.

BACKGROUND

Internet content authors and providers generally agree that serving a client base having disparate computing, data storage, and content presentation capabilities over networks having different data throughput characteristics that may vary over time presents a substantial challenge. Conventional content adaptation techniques attempt to meet this challenge by reducing the size of high-resolution Internet content via resolution and content reduction, and data compression. Such content size reduction generally speeds-up content delivery over a low-bandwidth connection to the client. Unfortunately, excessively reduced and compressed content often provide Internet client device users with a poor viewing experience that is not consistent with human perception. Moreover, such a viewing experience is typically contrary to the high quality impression that most content authors/providers prefer for the viewer to experience, and contrary to the universal access to high quality images viewers generally desire.

To make matters more difficult for content authors/providers and content consumers, small form factor computing devices (i.e., computing devices with compact design) are generally very limited in their capability to present large high quality images to the user. Instead, a substantial amount of manual user input/interaction (e.g., scrolling, tabbing, and zooming operations) is typically required for the user to view and/or locate interesting area(s) when browsing large images on small devices. This presents a catch-22 to content providers who desire to have high-quality images displayed for viewers, yet at the same time, do not wish to present large images to viewers since they generally require a considerable amount of manual user interaction to view the content/message. Systems and methods that address this dilemma are greatly desired.

SUMMARY

Systems and methods for automatic generation of a browsing path across image content to present areas with high attention value are described. In particular, an image is modeled via multiple visual attentions to create a respective set of attention objects for each modeled attention. The attention objects and their respective attributes are analyzed to generate a browsing path to select ones of the attention objects. The browsing path is generated to optimize the rate of information gain from the attention objects as a function of information unit cost in terms of time constraints associated with multiple image browsing modes.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
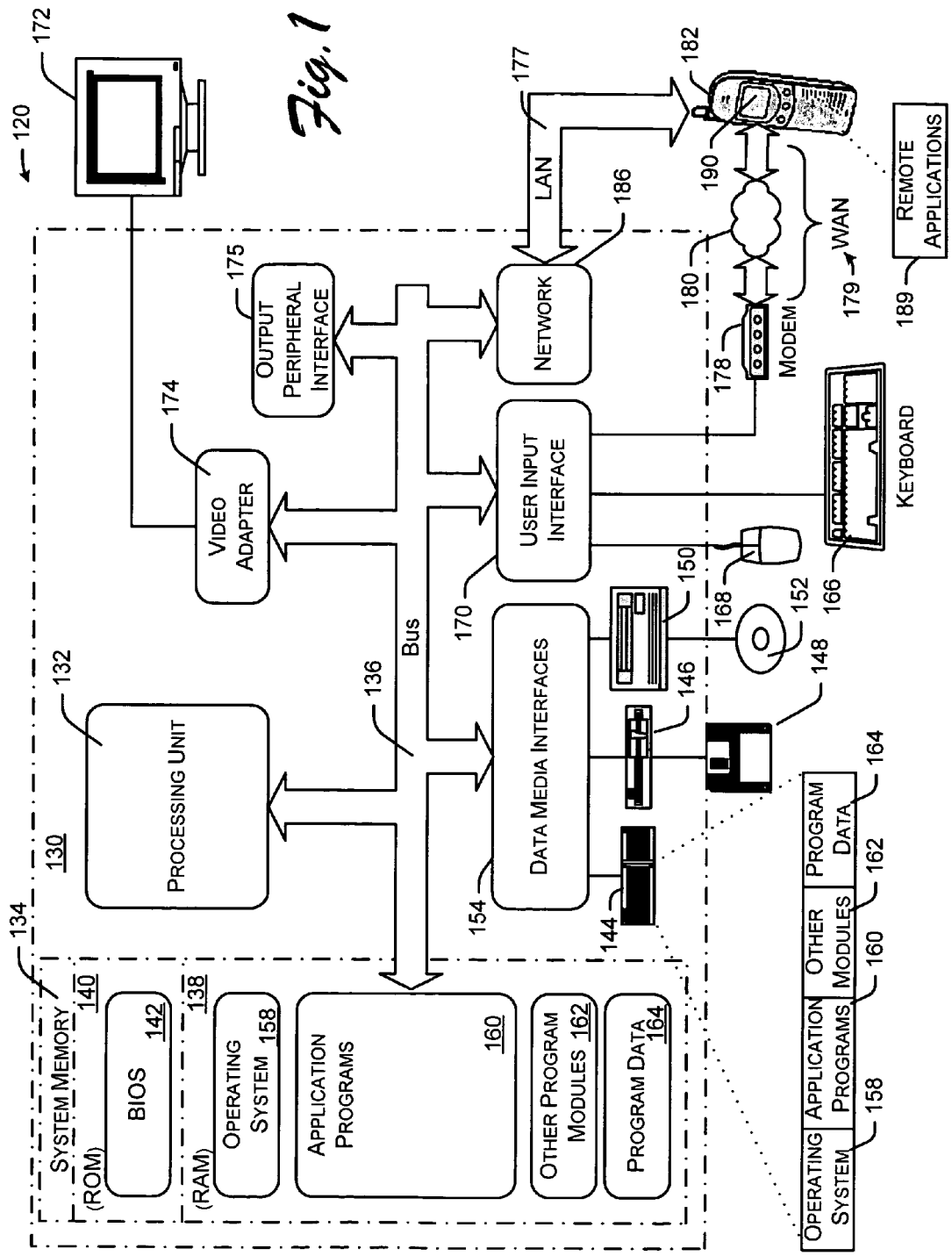
FIG. 1 is a block diagram of an exemplary computing environment within which systems and methods for automatic generation of a browsing path to present image areas having high information fidelity based on space and time may be implemented.

Conventional techniques predominantly utilize down sampling to fit an image to a small display, or rely on manual browsing by a user to zoom or scroll the image on a small display device so that the user may view all image content. As discussed above, image down-sampling or thumbnail views typically result in significant information loss due to excessive resolution reduction. Additionally, although manual browsing has been used to avoid such information loss, it is often a time-consuming, hit-and miss operation for a users to navigate and view (e.g., pan, zoom, etc.) to locate any most crucial information of a large image presented on a small display screen.

These limitations of conventional image presentation architectures and techniques are addressed by the following systems and methods, which calculate a substantially optimal navigation path through a large/high-quality image that has been adapted for presentation on a small display device. In particular, a framework automatically adapts image content to present objectively interesting portion(s) of the image based in part on the constraints of the device used to display the image to a user. Additionally, the framework calculates one or more browsing paths from one objectively important aspect of the adapted image content to another. Each browsing path is generated to simulate human browsing behaviors.

To this end, a browsing path is as a function of calculated attention value and image fidelity of attention objects in the image, specified minimal amounts of size and time conditions under which to present attention objects to a user, and preferred or identified user-browsing characteristics. Such characteristics include perusing or skimming browsing preferences or modes of operation. An image browser implements such browsing path(s) such that user browsing on a small form factor device is automatically presented with each objectively important image aspect at a minimal perceptible size and for a configurable minimal perceptual amount of time.

Automatic presentation means that a viewing window is automatically paned, zoomed, etc., according to the criteria of the browsing path to navigate to and present different parts of an image to a user. This allows the user to browse a large/high-quality image on a device with a limited amount screen space to display the image with a minimal amount of user interaction. This technique further ensures that the viewer will be presented those portions of the image determined to be of substantial attention and information fidelity value- and in a manner that provide effective use of scale and time that is not contrary to desires of content authors/providers or human perceptual experience.

In one implementation, the image-browsing path is automatically generated for a given image. In another implementation, a user can stop the automated process at any time, choose where to look (i.e., browse) interactively, and selectively resume the automatic browsing process afterwards.

An Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods for automatic generation of a browsing path to present image areas having high information fidelity based on space and time may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well-known computing systems, environments, and/or configurations that may be suitable include, but are not limited to, including small form factor (e.g., hand-held, mobile, etc.) computing devices (e.g., mobile phones, personal digital assistants—PDAs, etc.), multi-processor systems, microprocessor based or programmable consumer electronics, network PCs, minicomputers, mainframe computers, and/or so on. The invention is also practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. System memory 134 includes computer readable media in the form of volatile memory, such as random access memory (RAM) 138, and/or non-volatile memory, such as read only memory (ROM) 140. A basic input/output system (BIOS) 142, containing the basic routines that help to transfer information between elements within computer 130, such as during start-up, is stored in ROM 140. RAM 138 typically contains data and/or program modules that are immediately accessible to and/or presently being operated on by processor 132.

Computer 130 may further include other removable/non-removable, volatile/non-volatile computer storage media. For example, a hard disk drive 144 may be used for reading from and writing to a non-removable, non-volatile magnetic media (not shown), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 140, or RAM 138, including, e.g., an operating system 158, one or more application programs 160, other program modules 162, and program data 164.

A user may provide commands and information into computer 130 through input devices such as keyboard 166 and pointing device 168 (such as a "mouse"). In this implementation, such commands and information may indicate, for example, user preferences during navigation (browsing) path generation, user interventions to adjust or redirect automated browsing operations (e.g., manual overrides, or change in browsing mode such as from perusing to skimming modes, etc.). Other input devices (not shown) may include a microphone, joystick, game pad, satellite dish, serial port, scanner, digital camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include some or all of the elements and features described herein relative to computer 130. Logical connections include, for example, a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180. In this example, the remote computer 182 happens to be a small form factor device in the embodiment of a mobile telephone with a small display screen. The remote computer is representative of all possible types of computing devices that can be coupled to the computer 130 as described.

In a networked environment, program modules depicted relative to computer 130, or portions thereof, may be stored in a remote memory storage device. Thus, e.g., as depicted in FIG. 1, remote application programs 189 may reside on a memory device of remote computer 182. The network connections shown and described are exemplary. Thus, other means of establishing a communications link between the computing devices may be used.

Exemplary Application Programs and Data

Figure 2:
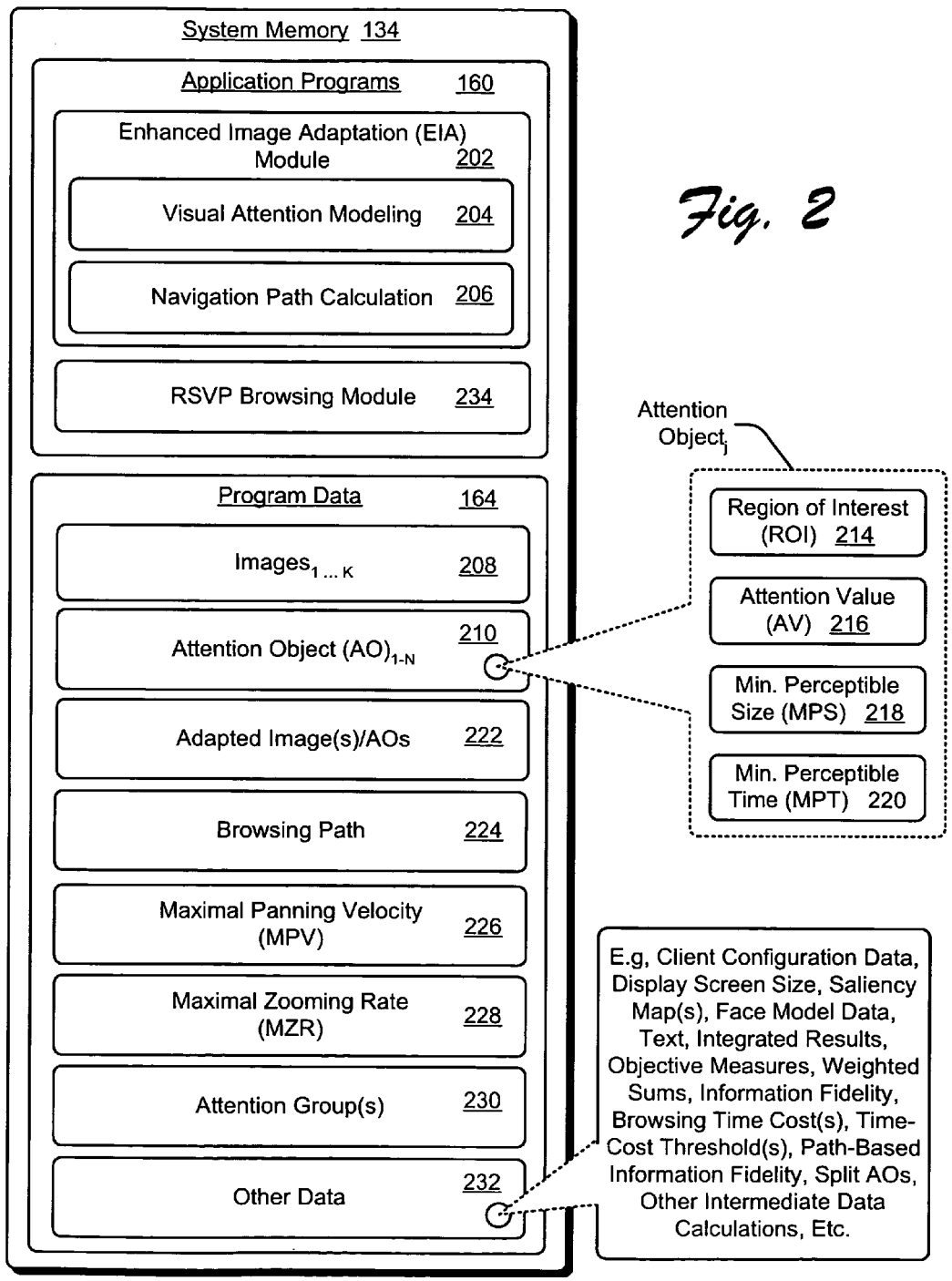
FIG. 2 shows exemplary application programs and program data for automatic generation of a browsing path to present image areas having high attention value as a function of space and time.

FIG. 2 shows further exemplary aspects of application programs 160 and program data 164 of FIG. 1 for automatic generation of a browsing path to present image areas of high attention value based on space and time. Although not limited to this particular implementation, these application programs and program data are especially suited for presenting and navigating digital image data on small form factor computing devices. To this end, application programs 160 include Enhanced Image Adaptation ("EIA") module 202, which in turn includes visual attention-modeling component 204 and navigation path calculation component 206. The visual attention-modeling ("VAM") component 204 analyzes images 208 in view of multiple visual attention models (e.g., saliency, face, text, etc.) to generate one or more attention objects (AOs) 210-1 through 210-N for each attention-modeling scheme utilized for each image 208-1 through 208-K of the content. That is:

$$\{AO_i\}=\{(ROI_i, AV_i, MPS_i, MPT_i)\}, 1 \leq i \leq N \qquad (1).$$

wherein, $AO_i$, represents the $i^{th}$ AO within the image 208; $ROI_i$ represents the Region-Of-Interest 210 of $AO_i$; $AV_i$ represents the Attention Value 214 of $AO_i$; $MPS_i$ represents the Minimal Perceptible Size 216 of $AO_i$; $MPT_i$ represents a minimal perceptual time for display of subject matter associated with the $AO_i$; and, N represents the total number of AOs 210 derived from the image 208.

For instance, when VAM component 204 performs saliency attention modeling, a first set of AOs $210_{i-n}$ representing saliency attention is generated for each image. Face attention modeling results in a second set of AOs $210_{i-n}$ representing face attention for each image, and so on. Attention modeling operations generate other attention data such as saliency map(s), face pose information, etc., all a function of the particular attention models being utilized. For purposes of discussion, such other information, intermediate data calculations, and so on, are represented in respective portion(s) of "other data" 232.

In this implementation, the one or more images 208 include, for example, a Web page designed in a markup language such as the Hypertext Markup Language (HTML), or any other set of digital images. Additionally, the attention models utilized by the VAM component 204 include, for example, saliency, face, text, human, animal, vehicle, and so on, attention models. However, in other implementations, the VAM component 204 integrates information generated from analysis of the image(s) via one different attention model algorithms possibly in combination with one or more of the listed attention modeling techniques.

Because of the visual attention modeling of the images 208-1 through 208-K, most perceptible information of any image is identified by a respective set of AOs 210-1 through 210-N. For this reason, each AO is an information carrier that has been computationally/objectively determined to deliver at least one intention of the content author or content provider.

For instance, an AO may represent a semantic object, such as a human face, a flower, a mobile car, text, and/or the like, that will catch part of the viewer's attention, as a whole. In light of this, the combination of information in the AOs 210 generated from an image 208 will catch most attentions of a viewer.

Attention Object Attributes

As indicated above, each AO 210 (each set of AOs 210-1 though 210-N—one set for each attention being modeled) is associated with four (4) respective attributes: a Region-Of-Interest (ROI) 214, an Attention Value (AV) 216, a Minimal Perceptible Size (MPS) 218, and a Minimal Perceptible Time (MPT) 220. We now describe these attributes. With respect to the Region-of-Interest (ROI) attribute 214, each ROI 214 is a spatial region or segment within an image that is occupied by the particular AO with which the ROI is associated. An ROI can be of any shape and ROIs of different AOs may overlap. In one implementation, a ROI is represented by a set of pixels in the original image. In another implementation, regular shaped ROIs are denoted by their geometrical parameters, rather than with pixel sets. For example, a rectangular ROI can be defined as {Left, Top, Right, Bottom} coordinates, or {Left, Top, Width, Height} coordinates, while a circular ROI can be defined as {Center_x, Center_y, Radius}, and so on.

With respect to the attention value (AV) attribute 216, each AV 216 indicates the relative weight of the corresponding AO's 210 contribution to the information contained in the image 208 as a whole, as compared to the weights of information/subject matter associated with the other AOs derived from the same image. To appreciate the role of an AV 214, it is helpful to point out that different AOs 210-1 through 210-N represent different portions and amounts of an image's 208-1 through 208-K information. To reflect this different in content, the EIA module 202 assigns each $AO_{i-N}$ 210 in the image a respective quantified attention value (AV) 216 to represent the objective value of its information as compared to the value of information of other AOs.

Now, turning to the minimal perceptible size attribute (MPS) 218, we first point out that the total amount of information that is available from any AO 210 is a function of the area it occupies on an image 208. Overly reducing the resolution of this information may remove the impact, content, or message that the image's author originally intended for a viewer to discern with respect to that area of the image. In light of this, the MPS 218 specifies a minimal allowable spatial area (i.e., the minimal perceptible size) for the AO. The EIA module 202 uses the MPS as a reduction quality threshold to determine whether an subject matter associated with the AO can be further sub-sampled or cropped during image adaptation operations without interfering with the intent, content quality, message, etc., that the content author/provider intended that portion of the image to present to a viewer.

For example, suppose an image 208 contains N number of AOs 210, $\{AO_i\}$, i=1, 2 . . . , N, where $AO_i$ denotes the $i^{th}$ AO within the image. The $MPS_i$ 218 of $AO_i$ indicates the minimal perceptible size of $AO_i$, which can be presented by the area of a scaled-down region. In the case where a particular AO represents a human face, whose original resolution is 75×90 pixels, the author/publisher may define its MPS to be 25×30 pixels; the smallest resolution to show the face region without severely degrading its perceptibility. The MPS assignment may be accomplished manually by user interaction, or calculated automatically in view of a set of rules. In this manner, the content adaptation module provides end-users with an adapted image that is not contrary to the impression that the content author/provider intended the end-user to experience.

We now turn to the minimal perceptible times (MPT)) attribute 220 for presenting AO 210 image subject matter. The MPT attribute 220 of an AO 210, identifies a minimal amount of time for presenting associated visual content to a user. When navigating visual content associated with one or more AO's of an image 208, if visual information associated with an AO that is presented to a viewer is not displayed on the display device for a long enough period-of-time (e.g., for an exemplary time within a range of 100-300 ms), the viewer may not perceive the visual information. For purposes of discussion, such a display device is represented by the display screen 172 or 190 of FIG. 1. To ensure that an AO's visual information is presented to the user for a substantially optimal amount-of-time—as objectively or subjectively determined programmatically or manually by a content author/provider, each AO includes the MPT 220 attribute.

To fit different content author and consumer needs, MPT 220 values (i.e., fixation times) may be a function of multiple configurable criteria. In one implementation, such criteria is based on the type of attention model (e.g., saliency, text, face, etc.) used to generate the associated AO 210, user preferences, current display conditions (e.g., whether the display screen is in a reflective or backlit mode), user browsing state (e.g., pursuing, skimming, fixation, etc.), associated AVs 216, and/or so on. For instance, an MPT 220 of a saliency region ($ROI_j$) in when the viewer is determined to be viewing visual information in perusing mode as compared to in a skimming mode. In perusing mode, more information is preferred by the user, thus the MPT 220 can be set for a longer duration than had the user been skimming the visual information. In skimming mode, less information is preferred, thus the MPT 220 can be set for a shorter duration.

Alternatively, and/or in combination with other criteria, an MPT 220 of a saliency region (ROI 214) is set proportional to the AO's corresponding AV 216 attribute. For instance, an MPT of some number of milliseconds (e.g., 300 ms) is determined to be the shortest amount of time to show the displayed portion of an AO without severely degrading its perceptibility.

In yet another example, MPTs 220 are set as a function of the type of attention modeling data represented by an AO 210. For instance, the appearance of a dominant face in an image 208 will almost certainly attract a viewers' attention. By employing a face detection algorithm, VAM component 204 obtains specific types of face attention data, including, for example, a number of faces, poses, regions, and positions of each face in the image. The MPT 220 of a face region (i.e., an ROI 214) is set to some number of ms (e.g., 200 ms) independent from the MPT value determination(s) associated with other identified types of face information such as pose, etc.

In yet another example, text regions (ROIs 214) also attract viewers' attention in many situations. One implementation defines an MPT 220 of a text region as a function of several parameters such as the number of words, or sentences, etc., in the text region. (Known text detection techniques can be used to estimate the number of words in an area with determined spatial coordinates). One implementation of the VAM component 204 employs an average of MPT 220 values (i.e., an $MPT_{average}$, e.g., 250 ms) for a word and defines the MPT 220 for a text region ($ROI_j$) as:

$$MPT_{text} = N_{text} \times MPT_{average} \qquad (2),$$

wherein $N_{text}$ denotes the number of detected words. Since fixation duration for a text region may change as a function of culture, educational background, eyesight, etc., MPT attributes 220 corresponding to text regions may also be adapted to user preference(s) and/or viewing habits over time.

Integration of Attention Modeling Results

For each image 208-1 through 208-K, the EIA module 202 integrates and analyzes the attention data (i.e., the attention data is encapsulated in the AOs 210) generated from each of the visual attention modeling operations. Such analysis identifies a region R of the image that includes one or more AOs 210-1 through 210-N with substantially high attention values (AVs) 216 as compared to other AOs of the image. (E.g., see region R 604 of FIG. 6). Thus, the identified region R is objectively determined to be most likely to attract human attention as compared to other portions of the image. The EIA module 202 then identifies a substantially optimal image adaptation scheme (e.g., reduction, compression, and/or the like) to adapt the region R, and the image as a whole, in view of client resource constraints and such that the highest image fidelity (IF) over the region R is maintained. The analyzed images are then adapted based on information from these AOs and in view of a target client display (e.g., screen 176 or 190 of FIG. 1) characteristics. These adapted images are represented as adapted image(s) 222. Further details of exemplary attention modeling result adaptation operations are now described.

Display Constraint-Based Presentation of High Attention Value Objects

The EIA module 202 manipulates AOs 210 for each image 208 to adapt the attention modeling results to represent as much information as possible under target client device resource constraints such as those imposed by limited display screen size, display resolution, etc. As described above, each AO 210 is reduced in size as a function not only of display screen size, but also as a function of the AO's quality reduction threshold attribute, the MPS 218. Thus, although the MPS 218 substantially guarantees a certain level of image quality, enforcement of an MPS may result in an adapted image 220 that is too large to view at any one time on a display screen (e.g., see displays 172 and 190 of FIG. 1). In other words, such an adapted image may need to be scrolled horizontally and/or vertically for all portions of the adapted image to be presented on the client display.

In light of this, and to ensure a substantially valuable viewing experience, the EIA module 202 directs the client device to initially present portions of the image represented by one or more AOs 210 with respective AVs 214 indicative of being more likely to attract user attention than other portions of the image. To illustrate such image adaptation in view of client resource constraints, please refer to the examples of FIGS. 3-5, which in combination show exemplary differences between conventional image adaptation results (FIG. 3) and exemplary image adaptation results according to the arrangements and procedures of this invention (FIGS. 4 and 5).

Figure 3:
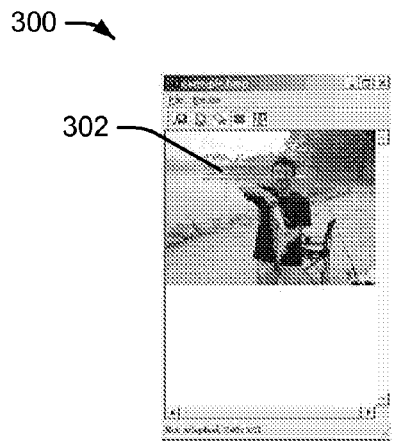
FIG. 3 illustrates conventional image adaptation results as displayed by a computing device.
Figure 4:
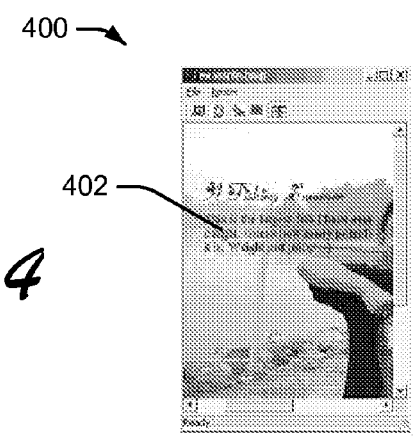
FIG. 4 shows an adapted image generated by exemplary attention-based modeling for adapting a large image for automatic browsing to areas of objectively high attention value on a small display device.

FIG. 3 shows exemplary results 300 of conventional image adaptation as displayed by a client device 300. Note that the informative text 302 in the upper left quadrant of the adapted image is barely recognizable. This is due to the excessive resolution reduction that was performed to fit the image to a screen dimension of 240×320 pixels, which is the size of a typical pocket PC screen. In contrast to FIG. 3, FIG. 4 shows an exemplary adapted image 400 that was generated by the attention-based modeling of client device 400. Note that even though the screen sizes of client device 300 and client device 400 are the same, text portion 402 of the image is much clearer as compared to the text 302 of FIG. 3. This is due to substantial optimization of the original image as a function of attention-modeling results, and selection of those portions of the image for presentation that have higher attention values in view of the target client resource constraints.

Figure 5:
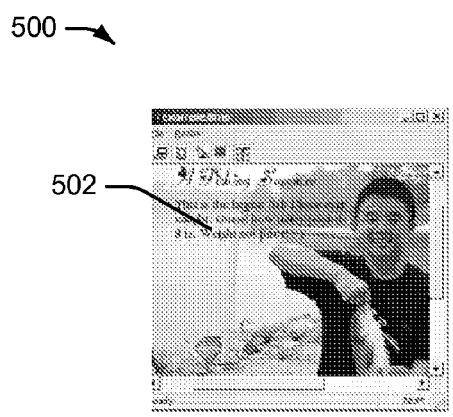
FIG. 5 shows an exemplary adapted image generated by attention-based modeling of an original image via the systems and methods for automatic generation of a browsing path to present image areas having objectively high attention value based on space and time.

FIG. 5 shows an exemplary adapted image that was generated by the attention-based modeling of an original image. In particular, client device 500 represents client device 400 of FIG. 4 in a rotated, or landscape position. Such rotation causes the landscape viewing function of the client display screen to activate via a client device display driver. Responsive to such rotation, the coordinates of the display screen change and the EIA module 202 of FIG. 2 generates an adapted image 220 (FIG. 2) to present clear views of both the text 502 and the face 504. Accordingly, the EIA module adapts images to present the most important aspect(s) of the adapted image in view of client device resource constraints (e.g., size, positional nature/screen rotation, etc.)

Visual Attention Modeling

Turning to FIG. 2, further details of the operations used by the EIA module 202 to perform visual attention modeling of the image(s) 208-1 through 208-K are now described. In particular, the EIA module analyzes each image in view of multiple visual attention models to generate attention model data 208. In this implementation, the attention models include, for example, saliency, face, and text attention models. However, in another implementation, the EIA module is modified to integrate information generated from analysis of the image(s) via different attention model algorithms.

Saliency Attention

The EIA module 202 generates three (3) channel saliency maps for each of the images 208-1 through 121-1. These saliency maps respectively identify color contrasts, intensity contrasts, and orientation contrasts. These saliency maps are represented as respective portions of attention data 208. Techniques to generate such maps are described in "A Model of Saliency-Based Visual Attention for Rapid Scene Analysis" by Itti et al., IEEE Transactions on Pattern Analysis and Machine Intelligence, 1998, hereby incorporated by reference.

The EIA module 202 then generates a final gray saliency map, which is also represented by attention data 208, by applying portions of the iterative method proposed in "A Comparison of Feature Combination Strategies for Saliency-Based Visual Attention Systems, Itti et al, Procedures of SPIE Human Vision and Electronic Imaging IV (HVEI'99), San Jose, Calif., Vol. 3644, pp. 473-82, January 1999, and hereby incorporated by reference. Saliency attention is determined via the final saliency map as a function of the number of saliency regions, and their brightness, area, and position in the gray saliency map.

To reduce image adaptation time, the EIA module 202 detects regions that are most attractive to human attention by binarizing the final saliency map. Such binarization is based on the following:

$$AV_{saliency} = \sum_{(i,j) \in R} B_{i,j} \cdot W^{i,j}_{saliency}, \quad (3)$$

wherein $B_{i,j}$ denotes the brightness of pixel point (i, j) in the saliency region $$R, W_{saliency}^{pos_{i,j}}$$

is the position weight of that pixel. Since people often pay more attention to the region near the image center, a normalized Gaussian template centered at the image is used to assign the position weight.

The size, the position and the brightness attributes of attended regions in the binarized or gray saliency map (attention data 208) decide the degree of human attention attracted. The binarization threshold is estimated in an adaptive manner. Since saliency maps are represented with arbitrary shapes with little semantic meaning. Thus, a set of MPS ratios 218 are predefined for each AO 210 that represented as a saliency map. The MPS thresholds can be manually assigned via user interaction or calculated automatically. For example, in one implementation, the MPS of a first region with complex textures is larger than the MPS of a second region with less complex texturing.

Face Attention

A person's face is generally considered one of the most salient characteristics of the person. Similarly, a dominant animal's face in a video could also attract viewer's attention. In light of this, it follows that the appearance of dominant faces in images 208 will attract a viewers' attention. Thus, a face attention model is applied to each of the images by the EIA module 202. Portions of attention data 208 are generated as a result, and include, for example, the number of faces, their respective poses, sizes, and positions.

A real-time face detection technique is described in "Statistical Learning of Multi-View Face Detection", by Li et al., Proc. of EVVC 2002; which is hereby incorporated by reference. In this implementation, seven (7) total face poses (with out-plane rotation) can be detected, from the frontal to the profile. The size and position of a face usually reflect the importance of the face. Hence, $$AV_{face} = \sqrt{Area_{face}} \times W_{face}^{pos}, \qquad (4)$$

wherein $Area_{face}$ denotes the size of a detected face region and $W_{face}^{pos}$ is the weight of its position. In one implementation, the MPS 218 attribute of an AO 210-1 through 210-N face attention model is a predefined absolute pixel area size. For instance, a face with an area of 25×30 pixels in size will be visible on many different types of devices.

Text Attention

Similar to human faces, text regions also attract viewer attention in many situations. Thus, they are also useful in deriving image attention models. There have been so many works on text detection and recognition and localization accuracy can reach around 90% for text larger than ten (10) points. By adopting a text detection, the EIA module 202 finds most of the informative text regions inside images 208-1 through 208-K. Similar to the face attention model, the region size is also used to compute the attention value 214 of a text region. In addition, the aspect ratio of region in included in the calculation in consideration that important text headers or titles are often in an isolated single line with large heights whose aspect ratios are quite different from text paragraph blocks. In light of this, the attention value for a text region is expressed as follows:

$$AV_{text} = \sqrt{Area_{text}} \times W_{AspectRatio} \qquad (5).$$

$Area_{text}$ denotes the size of a detected text region, and $W_{AspectRatio}$ is the weight of its aspect ratio generated by some heuristic rules. The MPS 218 of a text region (AO 210) can be predefined according to a determined font size, which can be calculated by text segmentation from the region size of text. For example, the MPS of normal text can be assigned from a specific 10 points font size in height.

Attention Model Adjustment—Post Processing

Before integrating the multiple visual attention measurements, the EIA module 202 adjusts each AO's 210 respective attention value (AV) 216. In one implementation, for purposes of simplicity, this is accomplished via a rule-based approach. For example, respective AO AV values in each attention model are normalized to (0, 1), and the final attention value is computed as follows:

$$AV_i = w_k \cdot \overline{AV_i^k} \qquad (6),$$

wherein $w_k$ is the weight of model k and $\overline{AV_i^k}$ is the normalized attention value of $AO_i$ detected in the model k, e.g. saliency model, face model, text model, or any other available model.

When adapting images contained in a composite content 206 such as a Web page, image 208 contexts are quite influential to user attention. To accommodate this variation in modeling image attentions, the EIA module 202 implements Function-based Object Model (FOM) to understand a content author's intention for each object in a Web page. Such FOM is described in Chen J. L., Zhou B. Y., Shi J., Zhang H. J. and Wu Q. F. (2001), Function-based Object Model Towards Website Adaptation, Proc. of the 10th Int. www Conf. pp. 587-596, hereby incorporated by reference. For example, images in a Web page may have different functions, such as information, navigation, decoration or advertisement, etc. By using FOM analysis, the context of an image can be detected to assist image attention modeling.

Attention-Based Image Adaptation

Operations to find an optimal image adaptation of content 206 that has been modeled with respect to visual attention, wherein the optimal image adaptation is a function of resource constraints of a target client device, are now described using integer programming and a branch-and-bound algorithm.

Information Fidelity

Information fidelity is the perceptual 'look and feel' of a modified or adapted version of content (or image), a subjective comparison with the original content 206 (or image 208)—a subjective comparison with the original version. Information fidelity can be calculated as the sum of attention values 216 during image adaptation and/or adapted image browsing path determination operations. The value of information fidelity is between 0 (lowest, all information lost) and 1 (highest, all information kept just as original). Information fidelity gives a quantitative evaluation of content adaptation that the optimal solution is to maximize the information fidelity of adapted content under different client context constraints. The information fidelity of an individual AO 210 after adaptation is decided by various parameters such as spatial region size, color depth, ratio of compression quality, etc.

Let us consider an image I (i.e., an image, 208) as a set of M×N evenly distributed information blocks $I_{ij}$:

$$I=\{I_{ij}\}=\{(AV_{ij},r_{ij})\}, 1\leq i\leq M, 1\leq j\leq N, r_{ij}\in(0,1) \quad (7),$$

where (i, j) corresponds to the location at which the information block $I_{ij}$ is sampled; $AV_{ij}$ is the visual attention value 216 of $I_{ij}$; $r_{ij}$ is the spatial scale of $I_{ij}$, representing the minimal spatial resolution to keep $I_{ij}$ perceptible. For example, considering a typical outdoor image, wherein a house is about ten meters in one dimension, faces in such an image are likely in less than three decimeter scale range. To address this disparity, the house can be scaled down more aggressively than the faces. In this implementation, the attention value 216 of each information block in an image is normalized so that their sum is 1.

For an image region R consisting of several AOs 210, the resulting information fidelity is the weighted sum of the information fidelity of all AOs in R. Since user's attention on objects always conforms to their importance in delivering information, attention values of different AOs are employed as the informative weights of contributions to the whole perceptual quality. Thus, the information fidelity of an adapted result can be described as follows:

$$IF_R = \sum_{ROI_i \subset R} AV_i \cdot IF_{AO_i}. \quad (8)$$

Adapting Images to Small Displays

Given the image attention model, now let us consider how to adapt an image 208 to fit into a small screen, which is often the major limitation of mobile devices. For purposes of discussion, such a mobile device or other client device is represented by computing device 130 of FIG. 1 or remote computing device 182, which is also located in FIG. 1. The small screen is represented in this example via display 176 or 190 of FIG. 1. It can be appreciated that when the computing device is a handheld, mobile, or other small footprint device that the display size may be much smaller (e.g., several centimeters in diameter) than a computer monitor screen. We address the problem of making the best use of a target area T to represent images while maintaining their original spatial ratios. Various image adaptation schemes can be applied to obtain different results. For each adapted result, there is a corresponding unique solution, which can be presented, by a region R in the original image. In other words, an adapted result is generated from the outcome of scaling down its corresponding region R. As screen size is a focus, we assume the color depth and compression quality does not change in our adaptation scheme.

Figure 6:
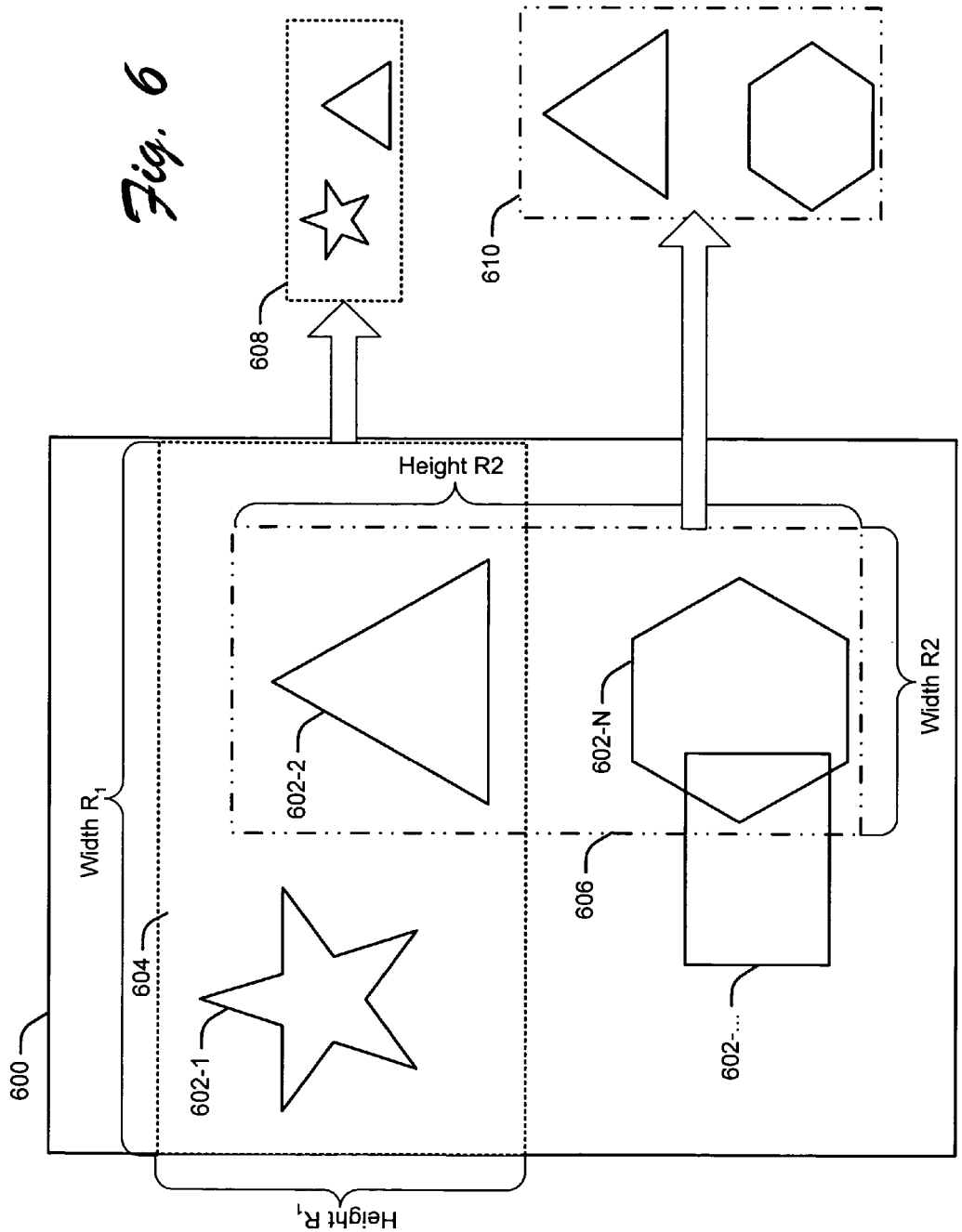
FIG. 6 shows exemplary image attention objects that have been segmented into regions and respectively adapted for display based on presentation characteristics of a target client display area.

FIG. 6 shows that image attention objects (AOs) are segmented into regions and respectively adapted to presentation characteristics of a client display target area. For purposes of discussion, the image 600 is one of the images 208-1 through 208-K of FIG. 2, and the AOs 602 represent respective ones of the AOs 210-1 through 210-N of FIG. 2. In this example, image regions include region 604 and region 606. Region 604 encapsulates AOs 602-1 and 602-2 and has a height $R_1$ and width $R_1$. Region 606 encapsulates AOs 602-2 and 602-K and has a height $R_2$ and width $R_2$. For purposes of discussion, regions 604 and 606 are shown as respective rectangles. However, in other implementations a region is not a rectangle but some other geometry.

In this example, region 604 has been adapted to region 608 by the EIA module 202 of FIG. 2, and region 606 has been adapted to region 610. In both cases of this example, note that the adapted region is dimensionally smaller in size than its corresponding parent region. However, as a function of the particular characteristics of the image and the target area of the client device, it is possible for an adapted region to be larger than the regions from which it was adapted. In other words, each region of an image is adapted as a function of the specific target area of the client device that is going to be used to present the content and the desired image fidelity, which is expressed as follows:

According to Equation (6), an objective measure for the information fidelity of an adapted image is formulated as follows:

$$IF_R = \sum_{ROI_i \subset R} AV_i \cdot IF_{AO_i} \quad (9)$$

$$= \sum_{ROI_i \subset R} AV_i \cdot u(r_R^2 \cdot size(ROI_i) - MPS_i),$$

where u(x) is defined as $$u(x) = \begin{cases} 1, & \text{if } x \geq 0 \\ 0, & \text{otherwise.} \end{cases}$$

Function size (x) calculates the area of a ROI, and $r_R$ denotes the ratio of image scaling down, which is computed as $$r_R = \min\left(\frac{Width_T}{Width_R}, \frac{Height_T}{Height_R}\right), \quad (10)$$

wherein, $Width_T$, $Height_T$, $Width_R$, and $Height_R$ represent the widths and heights of target area T and solution region R, respectively. As shown in FIG. 6, when adapting an image to different target areas, the resulting solution regions may be different.

This quantitative value is used to evaluate all possible adaptation schemes to select the optimal one, that is, the scheme achieving the largest IF value. Taking the advantage of our image attention model, we transform the problem of making adaptation decision into the problem of searching a region within the original image that contains the optimal AO set (i.e. carries the most information fidelity), which is defined as follows:

$$\max_R \left\{ \sum_{ROI_i \subset R} AV_i \cdot u(r_R^2 \cdot size(ROI_i) - MPS_i) \right\}. \quad (11)$$

The Image Adaptation Algorithm

For an image 208 with width m and height n, the complexity for finding an optimal solution is $O(m^2n^2)$ because of the arbitrary location and size of a region. Since m and n may be quite large, the computational cost could be expensive. However, since the information fidelity of adapted region is solely decided by its attention objects 210, we can greatly reduce the computation time by searching the optimal AO set before generating the final solution.

Determining a Valid Attention Object Set

We introduce I as a set of AOs, $I \subset \{AO_1, AO_2, \ldots AO_N\}$. Thus, the first step of optimization is to find the AO set that carries the largest information fidelity after adaptation. Let us consider $R_I$, the tight bounding rectangle containing all the AOs in I. We can first adapt $R_I$ to the target area T, and then generate the final result by extending $R_I$ to satisfy the requirements.

All of the AOs within a given region R may not be perceptible when scaling down R to fit a target area T. Thus, to reduce the solution space, an attention object set is valid if:

$$\frac{MPS_i}{\text{size}(ROI_i)} \leq r_I^2, \quad \forall\, AO_i \in I, \tag{12}$$

wherein $r_I$ ($r_I$ is equivalent to $r_{R_I}$ in Equation (8) for simplicity) is the ratio of scaling down when adapting the tight bounding rectangle $R_I$ to T, which can be computed as follows:

$$r_I = \min\left(\frac{Width_T}{Width_I}, \frac{Height_T}{Height_I}\right) \tag{13}$$

$$= \min\left(\frac{Width_T}{\max_{AO_i, AO_j \in I} |Right_i - Left_j|}, \frac{Height_T}{\max_{AO_i, AO_j \in I} |Bottom_i - Top_j|}\right).$$

Herein, $Width_I$ and $Height_I$ denote the width and height of $R_I$, while $Left_i$, $Right_i$, $Top_i$, and $Bottom_i$ are the four bounding attributes of the $i^{th}$ attention object.

$r_I$ in equation 10 is used to check scaling ratio, which should be greater than $\sqrt{MPS_i/\text{size}(ROI_i)}$ for any $AO_i$ belonging to a valid I. This ensures that all AO included in I is perceptible after scaled down by a ratio $r_I$. For any two AO sets $I_1$ and $I_2$, there has $r_{I_1} \geq r_{I_2}$, if $I_1 \subset I_2$. Thus, it is straightforward to infer the following property of validity from equation 10. If $I_1 \subset I_2$ and $I_1$ is invalid, then $I_2$ is invalid (property 1).

With the definition of valid attention object set, the problem of Equation (9) is further simplified as follows:

$$\max_I (IF_I) = \max_I \left( \sum_{AO_i \in I} AV_i \cdot u(r_I^2 \cdot \text{size}(ROI_i) - MPS_i) \right) \tag{14}$$

$$= \max_I \left( \sum_{AO_i \in I} AV_i \right)$$

$\forall$ valid $I \subset \{AO_1, AO_2, \ldots AO_N\}$.

As can be seen, this has become an integer programming problem and the optimal solution is found via use of a branch and bound algorithm.

Branch and Bound Process

Figure 7:
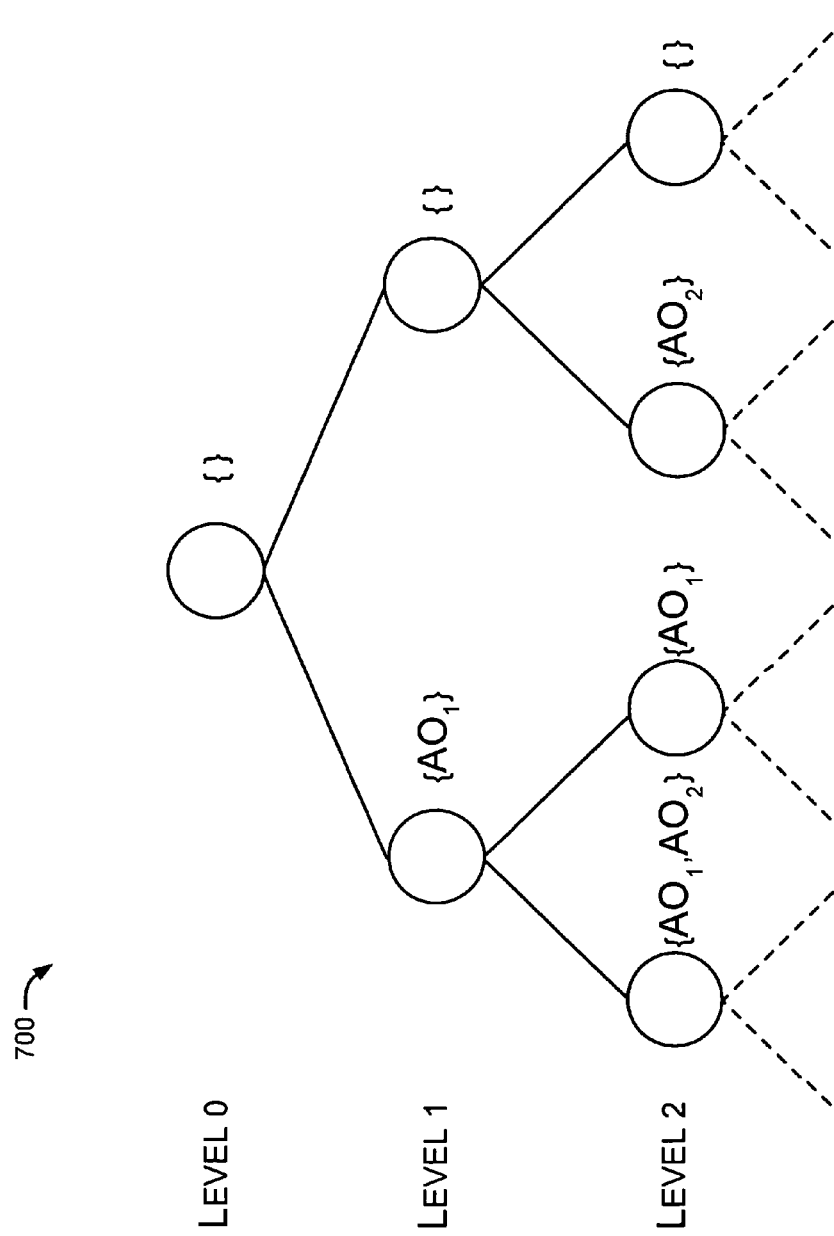
FIG. 7 shows a binary tree to illustrate a branch and bound process performed by exemplary systems and methods for image presentation to identify a substantially optimal image adaptation solution.

FIG. 7 shows a binary tree 700 to illustrate a branch and bound process to identify an optimal image adaptation solution. Each level 0-2 of the binary tree includes different sets of AOs 210-1 through 210-N. Each node of the binary tree denotes zero or more specific sets of AOs. Each bifurcation of the binary tree represents a decision/opportunity to keep or drop AO(s) of the next level. The height of the binary tree corresponds to K, the number of AOs inside the particular image (i.e., one of the images 208-1 through 208-K of FIG. 2). Each leaf node in this tree corresponds a different possible I.

For each node in the binary AO tree 700, there is a boundary on the possible IF value it can achieve among all of its sub-trees. The lower boundary is just the IF value currently achieved when none of the unchecked AOs can be added (i.e., the sum of IF values of AOs included in current configuration). The upper boundary is the addition of all IF values of those unchecked AOs after current level (i.e., the sum of IF values of all AOs in the image except those dropped before current level).

Whenever the upper bound of a node is smaller than the best IF value currently achieved, the whole sub-tree of that node is truncated. At the same time, for each node we check the ratio $r_I$ of its corresponding AO set I to verify its validity. If it is invalid, according to property 1, the whole sub-tree of that node is also truncated. By checking both the bound on possible IF value and the validity of each AO set, the computation cost is greatly reduced.

A number of techniques can be used to reduce binary tree 700 traversal time. For instance, arranging the AOs are arranged in decreasing order of their AVs at the beginning of search will decrease traversal times, since in most cases only a few AOs contribute the majority of IF value. Additionally, when moving to a new level k, it is determined whether $AO_k$ is already included in current configuration. If so, travel the branch of keeping $AO_k$ and prune the one of dropping $AO_k$ and all sub-branches.

Transform to Adapted Solution

After finding the optimal AO set $I_{opt}$, the EIA module 202 of FIG. 2 generates different possible solutions according to different requirements by extending $R_{I_{opt}}$ while keeping $I_{opt}$ valid. For instance, if an image 208-1 through 208-K has some background information which is not included in the attention model 208, the adapted result may present a region as large as possible by extending $R_{I_{opt}}$. The scaling ratio of final solution region is $$r_{I_{opt}}^{max} = \max_{AO_i \in I_{opt}} (MPS_i / \text{size}(ROI_i))$$

to keep $I_{opt}$ valid as well as to obtain the largest area. Therefore, $R_{I_{opt}}$ is extended to a region determined by $$r_{I_{opt}}^{max}$$

and T, within the original image.

In other cases, the adapted images 220 may be more satisfactory with higher resolution than larger area. To this end, $$R_{I_{opt}}$$

is extended, while keeping the scaling ratio at $$r_{I_{opt}} \text{ instead of}$$

$$r_{I_{opt}}^{max}.$$

However, it is worth noticing that in this situation, the scaled version of whole image will perhaps never appear in adapted results. Sometimes a better view of an image 208, or portions thereof, can be achieved when a display screen is rotated by ninety (90) degrees. In such a case, $I_{opt}$ carries more information than $I_{opt}$. In this case, the result is compared with the one for the rotated target area, and then select the better one as the final solution.

The complexity of this algorithm is exponential with the number of attention objects 210 within an image 208. However, the described techniques are efficiently performed because the number of attention objects in an image is often less than a few dozen and the corresponding attention values 214 are always distributed quite unevenly among attention objects.

Automatic Browsing Path Generation

When browsing large images on small devices, people often devote considerable efforts in scrolling and zooming to view the content. The navigation path calculation component 206 eliminates or at least reduces these efforts by providing Rapid Serial Visualization Presentation (RSVP) of information associated an image 208. The RSVP approach calculates a substantially optimal browsing path 224 across respective AO's 210 in an adapted image such that objectively important aspects of the image are automatically and/or semi-automatically viewed by a user in limited space (e.g., via a small form factor display) and time. The information fidelity (IF) of this RSVP-based approach is described as a function of both space and time:

$$f_{RSVP}(I, T) = \int_0^T \sum_{I_{ij} \in I_{RSVP}(t)} AV_{ij} u(r(t) - r_{ij}) dt, I_{RSVP}(t) \subseteq I, \quad (15)$$

where $I_{RSVP}(t)$ is a subset of the information blocks and varies with time T and $$r(t) = \max_{I_{ij} \in I_{RSVP}(t)} r_{ij} \leq \min\left(\frac{Width_{Screen}}{Width_{I_{RSVP}(t)}}, \frac{Height_{Screen}}{Height_{I_{RSVP}(t)}}\right), \quad (16)$$

varies with space.

Figure 8:
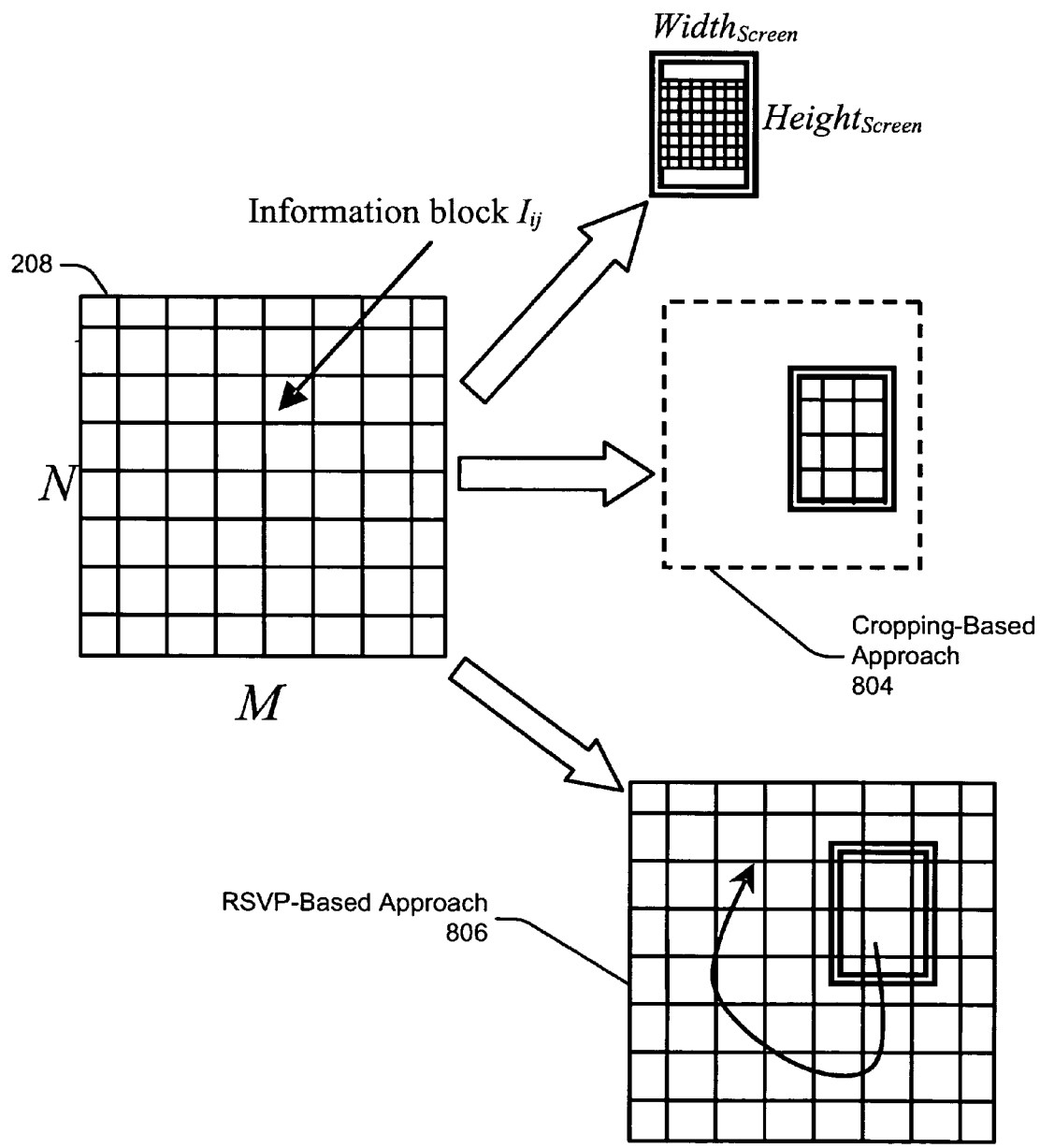
FIG. 8 shows a comparison of results of conventional direct-down sampling of an image and cropping to the novel Rapid Serial Visualization Presentation (RSVP) based approach of the systems and methods for automatic generation of a browsing path to present image areas having high attention value fidelity based on space and time.

FIG. 8 shows a comparison of results of conventional direct-down sampling of an image and existing image cropping techniques to the novel RSVP-based approach of the systems and methods for presenting a large image on a small display. As shown, in section 806, the RSVP-based approach automatically simulates a real browsing experience when browsing large images on a small screen. That is, a manual scroll of a window horizontally and vertically to view the different parts of an image, is automated via the function IRSVP(t). Viewing detail of an interesting region of an image (zooming) is automated by corresponding adjustment to r(t).

Image Browsing Path

The navigation path calculation module 206 models human browsing behavior with two mutually exclusive states: a fixation state—wherein a user exploits an interesting region, and a shifting state—wherein a user scrolls from one region to a next region. The fixation state corresponds to static viewing of AO(s) 210, and the shifting state is associated with traveling between different AOs 210. When a user stops navigating from one AO to another AO, the fixation state is again realized. The "shifting path" is the shortest path between centers of two fixation areas (i.e. AOs 210) delimited via beginning and endpoints of a shifting state transitions. Both modes (perusing and skimming) have fixation and shifting states. Two modes (perusing and skimming) are different in browsing path generating.

Browsing path P 224 is defined as a collection of successive path segments:

$$P = \{P_i\} = \{(SP_i, EP_i, SR_i, ER_i, T_i)\}, 1 \leq i \leq N \quad (17),$$

wherein $P_i$, represents an $i^{th}$ path segment, $SP_i$ represents a starting point of $P_i$, EP corresponds to an ending point of $P_i$, $SR_i$ is a starting resolution of $P_i$, $ER_i$ is an ending resolution of $P_i$, and $T_i$ is a time cost for scrolling from $SP_i$ to $EP_i$. Since path segments P are successive:

$$SP_i = EP_{i-1} \text{ and } SR_i = ER_{i-1}, \text{ for every } 1 \leq i \leq N \quad (18).$$

In this implementation, there are three (3) types of browsing patterns (shifting states): panning, zooming, and panning with zooming. Suppose there is a virtual intelligent camera that can pan and zoom in the original image, it will be automatically steered to deliver those important regions in an efficient way. To avoid hypermetric motion while browsing, Maximal Panning Velocity (MPV) 226 and Maximal Zooming Rate (MZR) 228 are defined. Velocity is considered to be uniform while in a shifting state (i.e., when moving). Therefore, a time cost $T_i$ for scrolling from starting point $SP_i$ to ending point $EP_i$ can be calculated as:

$$T_i = \max\left\{\frac{dist(SP_i, EP_i)}{MPV}, \frac{|SR_i - ER_i|}{MZR}\right\}, \quad (19)$$

wherein $dist(SP_i, EP_i)$ is defined as the Euclidean distance between $SP_i$ and $EP_i$. Values of MPV and MZR are currently defined manually as a function of user experience.

Browsing Path Calculation to Select Ones of the Attention Objects

According to the information foraging theory, people will modify strategy or structure of an environment to maximize their rate of gaining valuable information. With this in mind, let R denote the rate of gain of valuable information per unit cost, which can be computed as follows:

$$R = \frac{G}{T_B + T_w}, \quad (20)$$

wherein, G is a total net amount of valuable information gained, which can be seen as information fidelity (IF), as described above in equations 15 and 16. $T_B$ is the total amount of time spent on shifting between subsequent fixation areas (attention objects), $T_W$ represents the exploiting cost, which is the total duration of the MPTs 120 used while in a fixation state (i.e., in fixation areas).

The problem of identifying an optimal image browsing path 224 (P) is maximization of R, which is equivalent to the following equation:

$$\max_P \left\{\frac{f_P(I, T_P)}{T_P}\right\}, \quad (21)$$

wherein $f_P(I,T_P)=G$ and $T_P=T_B+T_W\cdot f_P(I,T_P)$ denotes the information fidelity provided in the image browsing path P, and $T_P$ stands for the total amount of time spent for fixation and shifting in P. Note that $f_P(I,T_P)$ is a special case of $f_{RSVP}(I,T)$ in Equation (15) because of the additional conditions imposed on the image browsing path P as indicated above in equation (17).

Accordingly, $$T_P = \sum_{1 \leq i \leq N} T_i + \sum_{AO_j \in A(EP_N, ER_N)} MPT_j + \sum_{1 \leq i \leq N} \sum_{AO_j \in A(SP_i, SR_i)} MPT_j, \quad (22)$$

wherein, A(loc, res) stands for the set of AOs 210 that are perceptible when the focus location is loc and the display resolution is res. These parameters are calculated based on the image attention model being used and target screen size. Similarly, $$f_P(I, T_P) = \sum_{AO_j \in A(EP_N, ER_N)} AV_j + \sum_{1 \leq i \leq N} \sum_{AO_j \in A(SP_i, SR_i)} AV_j. \quad (23)$$

The maximization of R is achieved either by maximizing information fidelity (IF) or minimizing time cost. Therefore, two (2) image browsing modes, "perusing" and "skimming" modes are presented. In perusing mode, a user prefers to spend as little time as possible as long as a certain percentage of the information is presented. In skimming mode, a user prefers to read as much information as possible within a limited period.

In skimming mode, the optimization problem becomes:

$$\text{Given } T_P \leq \lambda_T, \quad \text{Max}_P\{f_P(I, T_P)\}, \quad (24)$$

wherein, $\lambda_T$ is the threshold of maximal time cost that the user can afford, which is usually less than the minimal time cost to browsing all the attention objects. In perusing mode, the optimization problem becomes:

$$\text{Given } f_P(I, T_P) \geq \lambda_{AV}, \quad \text{Min}_P\{T_P\}, \quad (25)$$

wherein, $\lambda_{AV}$ stands for the minimal attention value or information percentage that user prefer to obtain, which is usually less than the total attention value in the image. To solve these optimization problems efficiently, a two-step approach is employed. First a preprocessing operation splits large AOs 210 into smaller sized AOs, and groups nearby AOs to form a set of attention groups 230. Then the optimal browsing path 224 is generated to connect the attention groups 230.

Pre-Processing

The image attention model itself does not ensure that the minimal display area for each AO 210 will be smaller than all kinds of target screen sizes. A large AO will not be able to be viewed properly if the screen size is smaller than its MPS. If left alone, this could cause problems to optimal browsing path generation. Therefore, large AOs 210 are split before grouping. A big saliency or text AO will be split evenly according to the screen size and its AV 216, MPS 218 and MPT 220 values will be evenly distributed to the newly created objects proportional to their area. In this implementation, face AOs are not split. This is because corresponding MPS 220 values will be usually smaller than the screen size.

After the splitting operations, nearby AOs 210 are combined into a set of attention groups 230. This helps to reduce the computational complexity of browsing path generation algorithms. The combination is based on the branch and bound algorithm discussed above. After obtaining the first attention group, we remove the objects in this group and apply the same algorithm to the rest attention objects iteratively. We define the AV of an attention group as the sum of AVs of perceptible attention objects in the group and the MPT as the sum of corresponding MPTs.

Path Generation Under Skimming Mode

In this browsing mode (i.e., the skimming mode), the objective of optimization is to find a sequence of $P_t$ to maximize the information fidelity within a limited period. The general problem is NP-hard and no efficient solution exists in terms of computational time or storage space. To address this mode of browsing, navigation path calculation module 204 component of the EIA module 202 uses a backtracking algorithm to enumerate all the possible paths through the subject matter of the OA's 210 and then finds the best one among them. Backtracking is an algorithmic technique to find solutions by trying one of several choices. If a choice proves incorrect, computation backtracks or restarts at the point of choice and tries another choice. It is often convenient to maintain choice points and alternate choices using recursion. Conceptually, a backtracking algorithm does a depth-first search of a tree of possible (partial) solutions. Each choice is a node in the tree.

In this implementation, backtracking operations are performed as follows:

Arrange attention groups 230 in decreasing attention value order based on constituent AO object attention values 216—the AV of a group is the sum of all constituent AO AVs.

For each ordered attention group 230, select the attention group 230 as a starting point; and, Use the backtracking algorithm described above to search among all possible paths from the selected starting point and calculate the total browsing time and the information fidelity for each path For each node in the backtracking tree, check the time cost (i.e., the amount of time to browse from one object to another) to ensure that it is smaller than a predefined and configurable threshold. In this implementation, the user defines the threshold.

Select the browsing path 224 with the largest information fidelity according to equations 15 and 16 as the resulting path.

Path Generation Under Perusing Mode

In perusing mode, the objective of optimization is to find a sequence of $P_t$ to minimize the time cost as long as a certain percentage of the information is presented to him. To solve this problem, the backtracking algorithm is adjusted as follows:

Arrange the attention groups 230 in an increasing order according to their respective AO MPTs 220.

For each group, select it as the starting point; and,

Use the backtracking algorithm to search among all possible paths from the selected starting point and calculate the total browsing time and the information fidelity for each path.

For each node in the backtracking tree:

There is a bound on the possible time cost it would spend among all of its sub-trees. The lower bound is the time that has been spent, and the upper bound is the addition of all possible time costs for those unchecked attention groups after current level in the backtracking tree.

Whenever the lower bound of a node is larger than the best time cost currently achieved, the whole sub-tree of that node will be truncated. If the information fidelity currently achieved is already greater than the predefined threshold, we will also not go any deeper in the sub-tree.

Select the browsing path with the least time cost as the resulting path.

The computational complexity of this algorithm is exponential. However, by checking both the bound on possible information fidelity value and the time bound of each path, the computation cost is greatly reduced. If $\lambda AV=1$, which may be the most common case indicating that the user want to view all the information, we can transform the problem to a Traveling Salesman Problem. Therefore, some approximation algorithms can be applied to get a fast but sub-optimal solution when the number of attention groups is large.

The computational complexity of these algorithms to locate a navigation path 224 through AO's 210 of an image 208 is exponential. However, by checking both the bound on possible information fidelity value and the time bound of each path, the computation cost is greatly reduced. If $\lambda_{AV}=1$, which may be the most common case indicating that the user desires to view all image 208 information, the problem is transformed into a Traveling Salesman Problem, wherein approximation algorithms are applied to get a fast but possibly sub-optimal browsing solution when the number of attention groups 230 is large.

Interactive Image Browsing

In one implementation, the navigation path calculation module 204 automatically determines a substantially optimal browsing path for a given image 208 as described above. In another implementation, the navigation path calculation module 204 allows the user to stop the automated process at any time, to select where to browse interactively. If desired, the used may subsequently resume the automatic browsing process provided by the navigation path calculation module 204. To these ends, the optimal browsing path 224 after user such user intervention is determined as follows. When the browsing process is paused, record the remaining set of attention objects $S_r$. During user interaction, record the set of attention objects $S_m$ viewed by the user. Re-generate the optimal path $\{P_i\}$ based on $S_r$-$S_m$. Move smoothly from current location to the starting point of $P_j$, and complete the rest of path as described in the previous section.

Figure 9:
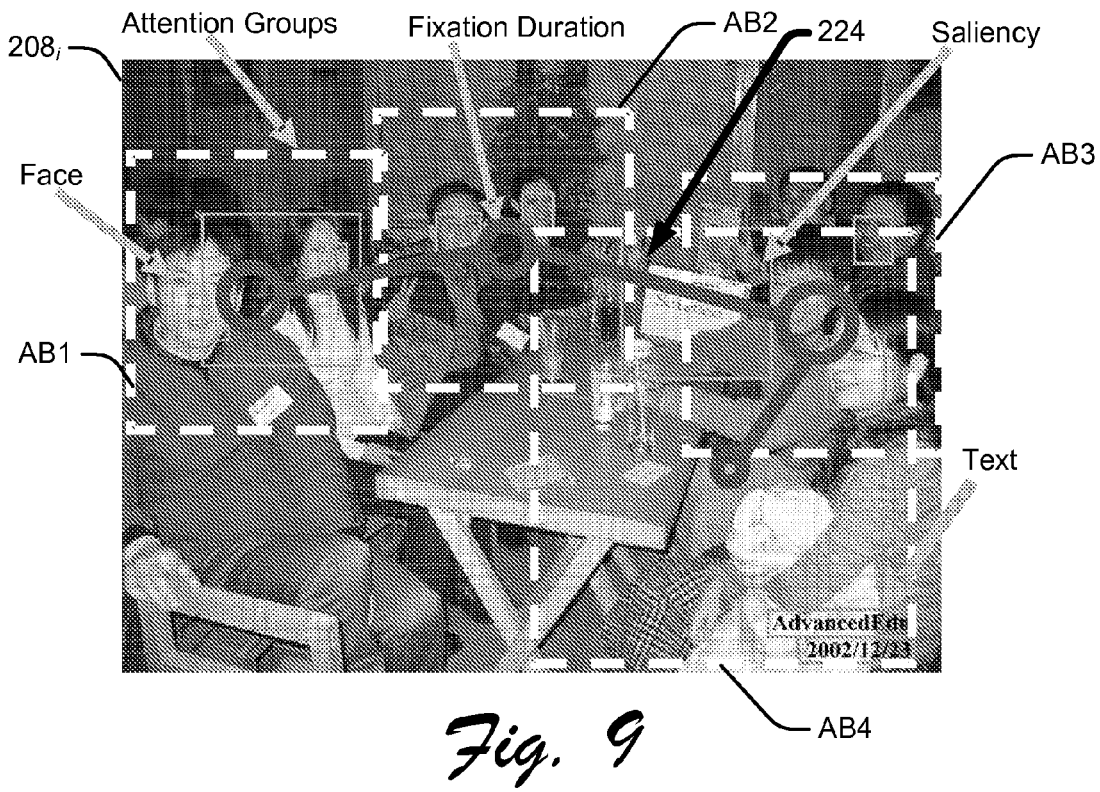
FIG. 9 shows an exemplary image that has been processed an embodiment of the Enhanced Image Adaptation module of the invention to determine a substantially optimal browsing path as a function of objective determinations of image attention content, relative attention value, information fidelity, client display characteristics, and user browsing modes.

FIG. 9 shows an exemplary image $208_j$ that has been processed an embodiment of the EIA module 202 to determine a substantially optimal browsing path 224 as a function of objective determinations of image attention content, relative attention value, information fidelity, client display characteristics, and user browsing modes. For purposes of discussion, the features of FIG. 9 are discussed with respect to the features of FIG. 2. As shown, in FIG. 9, eleven (11) attention objects (AO) 210 have been detected. Each AO 210 is represented as a solid line rectangle. The detected AOs include two (2) text objects, seven (7) face objects and two (2) saliency objects. A pre-processing operations splits large attention objects into smaller attention objects, and groups attention objects that in close proximity with respect to one-another, four attention groups are generated. In this example, each such attention group 230 is shown with a respective dashed-line rectangle. The four (4) attention groups 230 are labeled clockwise, from the left most group, as follows: AB1, AB2, AB3 and AB4.

Browsing path 224, which in this example is shown as three distinct navigational segments, is represented with relatively thicker width gray-scale lines with centered in-line dots. The browsing path 224 is generated by setting $\lambda_{AV}=1$ under perusing mode. During the automatic browsing process provided of this example, the window will move from AB1 to AB2, then AB3 and AB4. The user need not interact with the image (e.g., scroll, etc.) for this automatic browsing operation to occur. Each fixation point of this example is marked with a respective circle whose diameter represents the fixation duration (i.e., the Mean Perceptual Time—MPT 220 of the corresponding AO(s) 210). In one implementation, the attention value 216 of each AO 210 in an adapted image 222 is normalized so that their sum is one (1).

Figure 10:
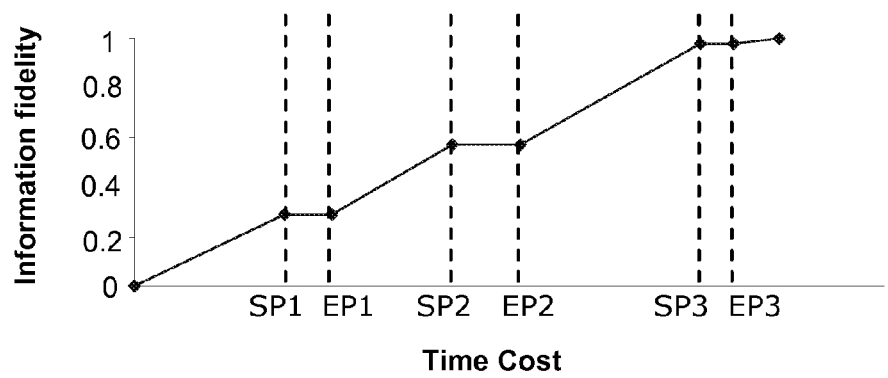
FIG. 10 is a graph that illustrates aspects of an exemplary automatically generated browsing path consisting of multiple successive path segments. In particular, the graph illustrates a trade-off between information fidelity of an attention object, or group of attention objects, and the time-cost to browse to the attention object(s)/group.

FIG. 10 is a graph 1000 that illustrates aspects of an exemplary automatically generated browsing path 224 comprising a collection of successive path segments. For purposes of discussion, the graph is shown with respect to three (3) path segments P1 through P3. As shown, $SP_i$ represents a starting point of $P_i$, and $EP_i$ represents and ending point of $P_i$, wherein i=1, 2, or 3. In particular, the graph illustrates a trade-off between information fidelity of an attention object, or group of attention objects, and the time-cost to browse to the attention object(s)/group.

An Exemplary Procedure

Figure 11:
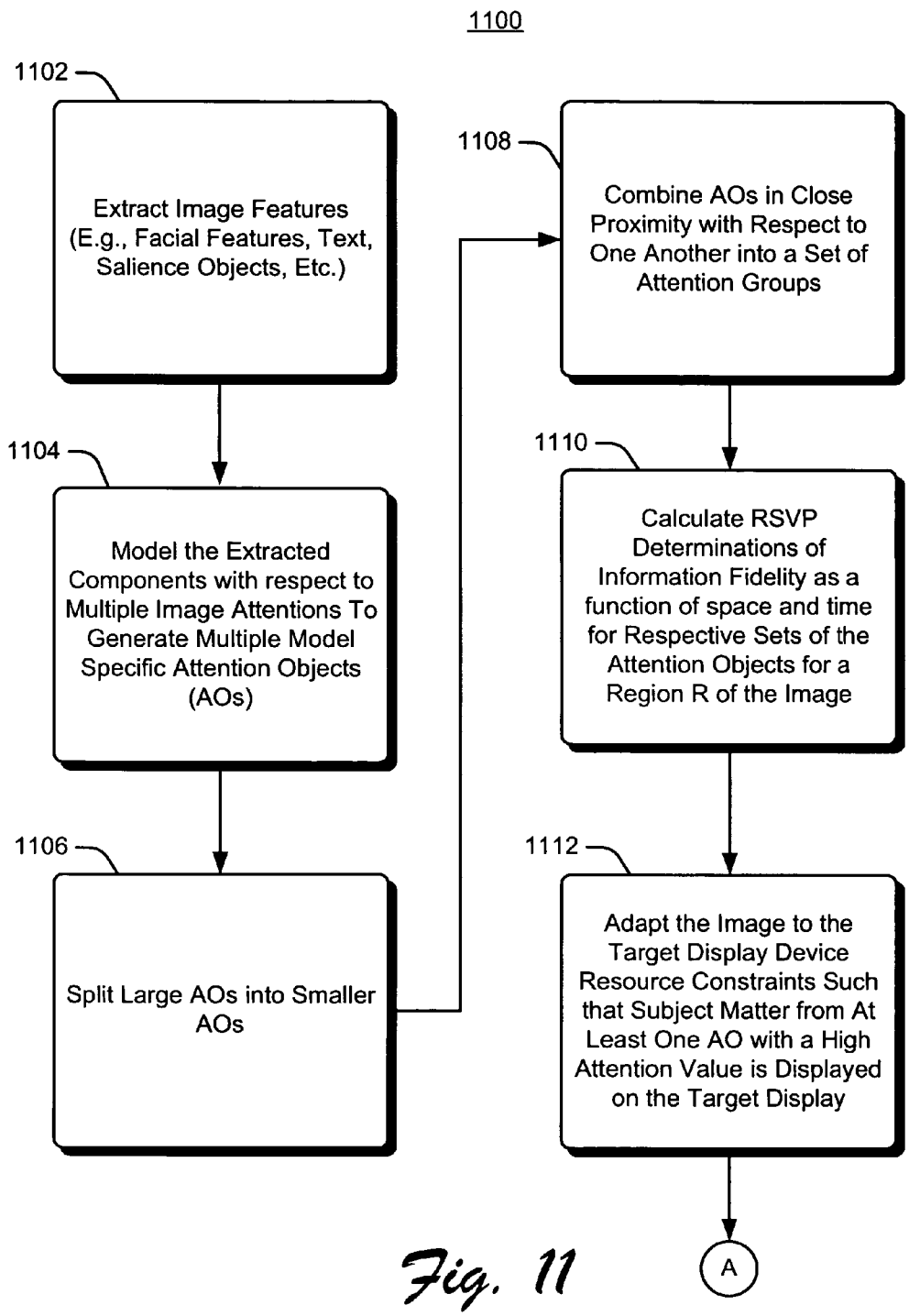
FIG. 11 shows an exemplary procedure for automatic browsing of an image as a function of derived attention values and information fidelity, target display device constraints, and user browsing modes that present a trade-off between time and space.

FIG. 11 shows an exemplary procedure to present an image as a function of multiple visual image attention models, derived attention value and information fidelity, target display device constraints, and user browsing modes that present a trade-off between time and space. For purposes of discussion, the operations of this procedure are described in reference to the program module and data components of FIG. 2. At block 1102, an input image 208 is analyzed to extract both top-down and bottom-up features, e.g., human facial features, text or saliency objects. At block 1104, the EIA module 202 (FIG. 2) analyzes an image 208 with respect to multiple visual attentions (e.g., saliency, face, text, etc.) to generate respective attention objects (AOs) 210 for each of the image attentions utilized.

At block 1106, relatively large attention objects 210 are split into smaller attention objects. At block 1108, attention objects 210 of a same model in relative close proximity to other attention objects 210 are combined to create a set of attention groups 230. Attention objects of different models can also be combined to create attention groups. At block 1110, the EIA module determines RSVP-based information fidelity (IF) for a region R of the image as a function of time and space; time being based on user browsing mode, and space being a function of target client device display size. In this operation, the IF calculation is based on equations 15 and 16, which calculate RSVP IF for selected AOs 210. At block 1112, the EIA module 202 adapts, according to a number of objective criteria, at least a subset of the attention objects 210 for presentation onto a target display device. Such objective criteria include, for example, size of the target display area (e.g., displays 172 or 190 of FIG. 1), weighted IF sums from attention objects 210. Such an adapted image is represented by the adapted image 220 of FIG. 2. The operations of the procedure 1100 continue at block 1202 of FIG. 12 as indicated by on-page reference A.

Figure 12:
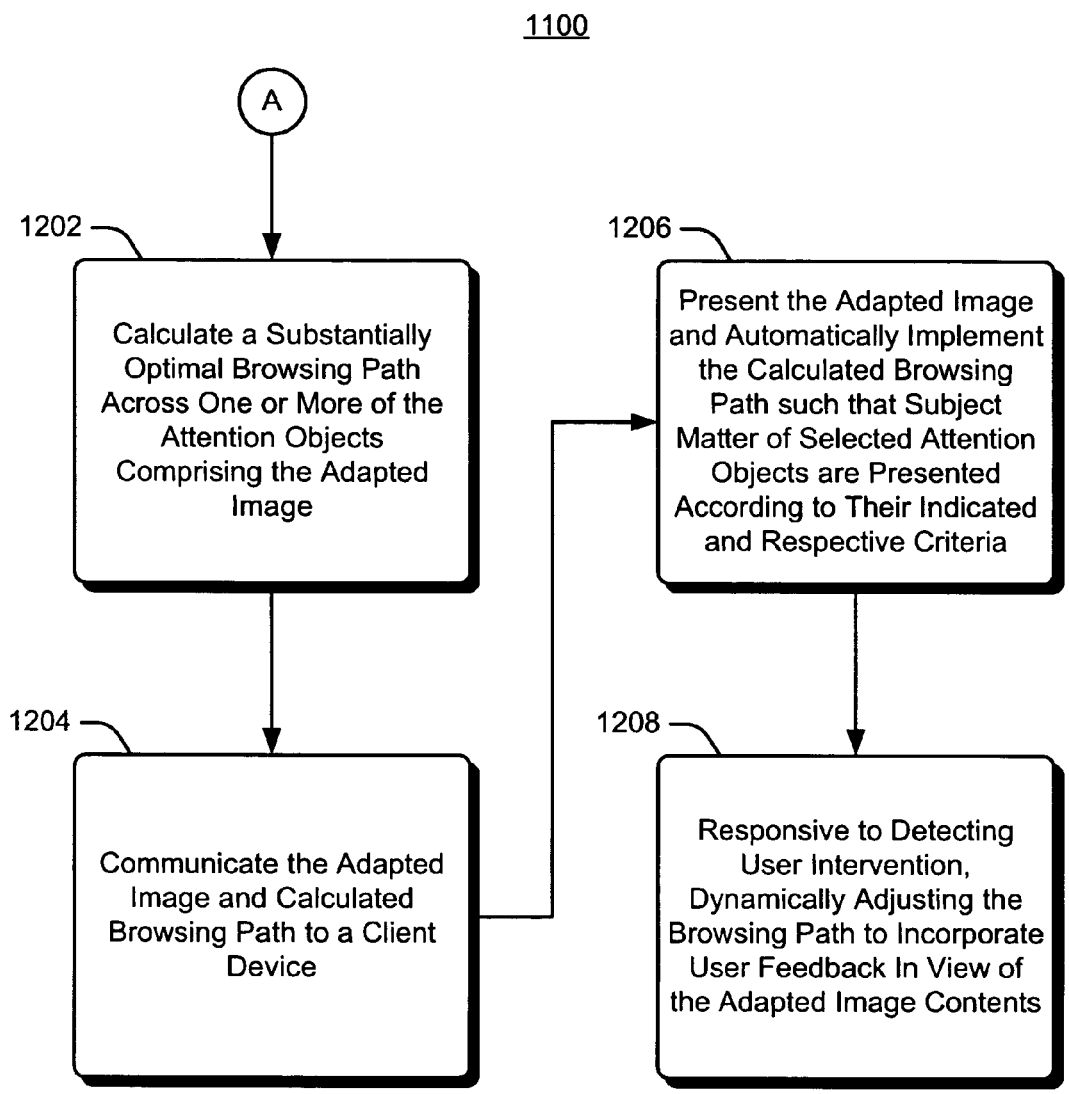
FIG. 12 shows further aspects of the exemplary procedure of FIG. 11 for automatic browsing of an image as a function of derived attention values and information fidelity, target display device constraints, and user browsing modes that present a trade-off between time and space.

FIG. 12 shows further aspects of the exemplary procedure of FIG. 11 to present an image as a function of multiple visual image attention models, derived attention value and information fidelity, target display device constraints, and user browsing modes that present a trade-off between time and space. At block 1202, the EIA module generates a substantially optimal navigation path 224 across one or more of the attention objects 210 comprising the adapted image 220. This navigation, or "browsing path" 224 is based on a combinations of user browsing mode (perusing or skimming), attention values and information fidelities of the constituent subject matter associated with the AOs, and/or minimal perceptible size(s) and time for perception (MPTs 220) of the subject matter. At block 1204, the adapted image, which includes the calculated browsing path 224, is optionally communicated to a different client device for presentation (the target display may reside on the same device that performs the image adaptation operations).

At block 1206, a client device, such as a mobile small form factor device, presents the adapted image and automatically follows the provided browsing path 224, and presenting subject matter of selected ones of the attention objects according to their indicated criteria.

In one implementation, the image-browsing module, shown in FIG. 2 as RSVP browsing module 234, utilizes scripting or HTML instructions to peruse or skim the adapted image according to the generated browsing path 224. In another implementation, operations described with respect to the image-browsing module can be implemented as respective functionality in a standalone image browser.

At block 1208, the RSVP browsing module 234, responsive to determining that a viewer has interrupted automatic implementation of the browsing path, dynamically adjusts the path to incorporate the user intervention in view of adapted image 220 contents.

Conclusion

The systems and methods of the invention adapt an image for substantially optimal presentation and navigation of large images on small form factor devices. To this end, an image is analyzed in view of multiple visual image attention models to objectively adapt the image to target client device presentation constraints, and automatically present important aspects of the image to the user further as a function of user browsing behavior. Although the systems and methods have been described in language specific to structural features and methodological operations, the subject matter as defined in the appended claims are not necessarily limited to the specific features or operations described. For instance, although FIG. 2 illustrates the EIA module 202 and the RSVP browsing module 234 on the same device, these components may respectively reside on different computing devices independent of the presence of the other module. Thus, the specific features and operations are disclosed as exemplary forms of implementing the claimed subject matter.

The invention claimed is:

1. A method comprising:
modeling an image with respect to multiple visual attentions to generate a respective set of attention objects (AOs) for each attention of the visual attentions;
analyzing the attention objects and corresponding attributes to optimize a rate of information gain as a function of information unit cost in terms of time associated with multiple image browsing modes; and
responsive to analyzing the attention objects, generating a browsing path to select ones of the attention objects, wherein generating the browsing path further comprises creating the browsing path in view of a perusing image-browsing mode as follows:
splitting one or more large AOs of the AOs into smaller AOs;
combining AOs in close proximity to one another into one or more attention groups;
arranging the attention groups in decreasing order based on respective attention values;
for each attention group of the attention groups:
selecting the attention group as a starting point;
for each path of all possible paths from the starting point:
calculating a total browsing time and an information fidelity; and
if the information fidelity is smaller than a browsing time threshold, discarding the path;
selecting a non-discarded path having a smallest browsing time as the browsing path, the browsing path connecting each of the attention groups.

2. A method as recited in claim 1, wherein the multiple visual attentions are based on saliency, face, and text attention models.

3. A method as recited in claim 1, wherein the image browsing modes comprise a perusing mode and a skimming mode.

4. A method as recited in claim 1, wherein the select ones have relatively greater information fidelity as compared to different ones of the attention objects.

5. A method as recited in claim 1, wherein the corresponding attributes for each attention object of the attention objects comprise a minimal perceptible time (MPT) for display of subject matter associated with the attention object, and wherein the method further comprises calculating the MPT as a function of:
a number of words in the subject matter;
whether the subject matter is for presentation to a viewer in a perusing image browsing mode or a skimming image browsing mode;
user preferences; and/or,
display context.

6. A method as recited in claim 1, wherein modeling further comprises:
creating a visual attention model for the image, the visual attention model being generated according to $$\{AO_i\}=\{(ROI_i, AV_i, MPS_i, MPT_i)\}, 1 \leq i \leq N; \text{ and,}$$

wherein $AO_i$, represents an $i^{th}$ AO within the image, $ROI_i$ represents a region-of-interest of $AO_i$, $AV_i$ represents an attention value of $AO_i$, $MPS_i$ represents a minimal perceptible size of $AO_i$, $MPT_i$ represents a minimal perceptual time for display of subject matter associated with the $AO_i$, and, N represents a total number of AOs modeled from the image.

7. A method as recited in claim 1, wherein the browsing path comprises a number of successive path segments described as follows:

$$P=\{P_i\}=\{(SP_i, EP_i, SR_i, ER_i, T_i)\}, 1 \leq i \leq N, \text{ and}$$

wherein $P_i$ represents an $i^{th}$ path segment, $SP_i$ represents a starting point of $P_i$, $EP_i$ corresponds to an ending point of $P_i$, $SR_i$ is a starting resolution of $P_i$, $ER_i$ is an ending resolution of $P_i$, and $T_i$ is a time cost for scrolling from $SP_i$ to $EP_i$.

8. A method as recited in claim 1, wherein generating the browsing path further comprises creating the browsing path as a function of a fixation state or a shifting state.

9. A method as recited in claim 1, wherein generating the browsing path further comprises calculating an information fidelity for each AO, the information fidelity being a function of an attention value (AV) and the minimal perceptible time (MPT) for display of subject matter associated with the AO.

10. A method as recited in claim 1:
wherein each AO is a respective information block and wherein the image (I) is a modeled as a set of M×N evenly distributed information blocks $I_{ij}$ as follows:

$$I=\{I_{ij}\}=\{(AV_{ij}, r_{ij})\}, 1 \leq i \leq M, 1 \leq j \leq N, r_{ij} \in (0,1),$$

wherein (i, j) corresponds to a location at which the information block $I_{ij}$ is modeled according to a visual attention, $AV_{ij}$ is a visual attention value of $I_{ij}$, $r_{ij}$ is the spatial scale of $I_{ij}$, representing the minimal spatial resolution to keep $I_{ij}$ perceptible; and,
wherein generating the browsing path further comprises calculating an information fidelity ($f_{RSVP}$) for each AO, the information fidelity being calculated as follows for respective ones of the information blocks $I_{ij}$:

$$f_{RSVP}(I, T) = \int_0^T \sum_{I_{ij} \in I_{RSVP}(t)} AV_{ij} u(r(t) - r_{ij}) dt, I_{RSVP}(t) \subseteq I; \text{ and}$$

wherein $I_{RSVP}(t)$ is a subset of the information blocks and varies with time (T) and $$r(t) = \max_{I_{ij} \in I_{RSVP}(t)} r_{ij} \leq \min\left(\frac{Width_{Screen}}{Width_{I_{RSVP}(t)}}, \frac{Height_{Screen}}{Height_{I_{RSVP}(t)}}\right),$$

which varies with space.

11. A method as recited in claim 1, further comprising:
detecting user intervention during automatic playback of the browsing path;
responsive to detecting the user intervention:
    recording all AOs $S_r$ of the AOs that have not been browsed;
    identifying all AOs $S_m$ of the AOs browsed during the user intervention;
    regenerating the browsing path based on $S_r$-$S_m$; and
    responsive to regenerating the browsing path and determining that there is at least a lull in user intervention, automatically navigating the browsing path.

12. A computer-readable medium comprising computer-program instructions executable by a processor for:
modeling an image with respect to multiple visual attentions to generate a respective set of attention objects (AOs) for each attention of the visual attentions, the AOs representing respective regions of the image;
analyzing the attention objects and corresponding attributes to in view of a model for human browsing behavior, the model comprising fixation and shifting states, in the fixation state an interesting region of the regions is exploited for information, in the shifting state one region of the regions is replaced with another region of the regions as a function of image view manipulation operations comprising scrolling or tabbing operations, and wherein the corresponding attributes for each attention object of the AOs comprise a minimal perceptible time (MPT) for display of subject matter associated with the attention object; and
responsive to the analyzing, optimizing a rate of information gain in terms of space as a function of information unit cost in terms of time associated with the model for human browsing behavior to generate a browsing path to select ones of the attention objects;
wherein the computer-program instructions for optimizing further comprise instructions for determining the rate of information gain R as follows:

$$R = \frac{G}{T_B + T_W},$$

wherein, G is a total net amount of objectively valuable information gained as determined via information fidelity determinations, $T_B$ is a total amount of time spent on shifting between subsequent fixation areas (AOs), $T_W$ represents an exploiting cost, which is a total duration of the MPTs used while in a fixation state.

13. A computer-readable medium as recited in claim 12, wherein the multiple visual attentions are based on saliency, face, and text attention models.

14. A computer-readable medium as recited in claim 12, wherein the select ones have relatively greater information fidelity as compared to different ones of the attention objects.

15. A computer-readable medium as recited in claim 12, wherein the computer-program instructions further comprise instructions for generating the browsing path as a number of successive path segments as follows:

$$P=\{P_i\}=\{(SP_i, EP_i, SR_i, ER_i, T_i)\}, 1 \leq i \leq N, \text{ and}$$

wherein $P_i$ represents an $i^{th}$ path segment, $SP_i$ represents a starting point of $P_i$, $EP_i$ corresponds to an ending point of $P_i$, $SR_i$ is a starting resolution of $P_i$, $ER_i$ is an ending resolution of $P_i$, and $T_i$ is a time cost for scrolling from $SP_i$ to $EP_i$.

16. A computer-readable medium as recited in claim 12, wherein the computer-program for generating the browsing path further comprise instructions for calculating an information fidelity for each AO, the information fidelity being a function of an attention value (AV) and the minimal perceptible time (MPT) for display of subject matter associated with the AO.

17. A computer-readable medium as recited in claim 12, wherein each AO is a respective information block, and wherein the computer-program instructions further comprise instructions for:
representing the image (I) as a set of M×N evenly distributed information blocks $I_{ij}$ as follows:

$$I=\{I_{ij}\}=\{(AV_{ij}, r_{ij})\}, 1 \leq i \leq M, 1 \leq j \leq N, r_{ij} \in (0,1),$$

wherein (i, j) corresponds to a location at which the information block $I_{ij}$ is modeled according to a visual attention, $AV_{ij}$ is a visual attention value of $I_{ij}$, $r_{ij}$ is the spatial scale of $I_{ij}$, representing the minimal spatial resolution to keep $I_{ij}$ perceptible; and, generating the browsing path further by calculating an information fidelity ($f_{RSVP}$) for each AO as follows for respective ones of the information blocks $I_{ij}$:

$$f_{RSVP}(I,T) = \int_0^T \sum_{I_{ij} \in I_{RSVP}(t)} AV_{ij} u(r(t) - r_{ij}) dt, \; I_{RSVP}(t) \subseteq I; \text{ and}$$

wherein $I_{RSVP}(t)$ is a subset of the information blocks and varies with time and $$r(t) = \max_{I_{ij} \in I_{RSVP}(t)} r_{ij} \leq \min\left(\frac{Width_{Screen}}{Width_{I_{RSVP}(t)}}, \frac{Height_{Screen}}{Height_{I_{RSVP}(t)}}\right),$$

which varies with space.

18. A computer-readable medium as recited in claim 12, wherein the computer-program instructions further comprise instructions for optimizing the rate of information gain R either by maximizing information fidelity or by minimizing time cost.

19. A computer-readable medium as recited in claim 12, wherein the computer-program instructions further comprise instructions for optimizing the rate of information gain R in the shifting mode as follows:

$$\text{Given } T_P \leq \lambda_T, \; \max_P \{f_P(I, T_P)\},$$

wherein, $T_p$ represents a total amount of time spent for fixation and shifting in the browsing path P, $\lambda_T$ is a threshold of maximal time cost, and I represents the image.

20. A computer-readable medium as recited in claim 12, wherein the computer-program instructions further comprise instructions for optimizing the rate of information gain R in the shifting mode as follows:

$$\text{Given } f_P(I, T_P) \geq \lambda_{AV}, \; \min_P \{T_P\},$$

wherein, $T_p$ represents a total amount of time spent for fixation and shifting in the browsing path P, $\lambda_{AV}$ represents a minimal attention value or information percentage for attainment.

21. A computer-readable medium as recited in claim 12, further comprising:
detecting user intervention during automatic playback of the browsing path;
responsive to detecting the user intervention:
recording all AOs $S_r$ of the AOs that have not been browsed;
identifying all AOs $S_m$ of the AOs browsed during the user intervention;
regenerating the browsing path based on $S_r$-$S_m$; and
responsive to regenerating the browsing path and determining that there is at least a lull in user intervention, automatically navigating the browsing path.

22. A computing device comprising a processor coupled to a memory, the memory comprising computer-program instructions executable by the processor for:
modeling an image with respect to multiple visual attentions to generate a respective set of attention objects (AOs) for each attention of the visual attentions, the AOs representing respective regions of the image;
analyzing the attention objects and corresponding attributes to in view of a model for human browsing behavior, the model comprising fixation and shifting states, in the fixation state an interesting region of the regions is exploited for information, in the shifting state one region of the regions is replaced with another region of the regions as a function of image view manipulation operations comprising scrolling or tabbing operations, and wherein the corresponding attributes for each attention object of the AOs comprise a minimal perceptible time (MPT) for display of subject matter associated with the attention object; and
responsive to the analyzing, optimizing a rate of information gain in terms of space as a function of information unit cost in terms of time associated with the model for human browsing behavior to generate a browsing path to select ones of the attention objects;
wherein the computer-program instructions for optimizing further comprise instructions for determining the rate of information gain R as follows:

$$R = \frac{G}{T_B + T_W},$$

wherein, G is a total net amount of objectively valuable information gained as determined via information fidelity determinations, $T_B$ is a total amount of time spent on shifting between subsequent fixation areas (AOs), $T_W$ represents an exploiting cost, which is a total duration of the MPTs used while in a fixation state.

23. A computing device as recited in claim 22, wherein the multiple visual attentions are based on saliency, face, and text attention models.

24. A computing device as recited in claim 22, wherein the select ones have relatively greater information fidelity as compared to different ones of the attention objects.

25. A computing device as recited in claim 22, wherein the computer-program instructions further comprise instructions for generating the browsing path as a number of successive path segments as follows:

$$P=\{P_i\}=\{(SP_i, EP_i, SR_i, ER_i, T_i)\}, \; 1 \leq i \leq N, \text{ and}$$

wherein $P_i$ represents an $i^{th}$ path segment, $SP_i$ represents a starting point of $P_i$, EP corresponds to an ending point of $P_i$, $SR_i$ is a starting resolution of $P_i$, $ER_i$ is an ending resolution of $P_i$, and $T_i$ is a time cost for scrolling from $SP_i$ to $EP_i$.

26. A computing device as recited in claim 22, wherein the computer-program for generating the browsing path further comprise instructions for calculating an information fidelity for each AO, the information fidelity being a function of an attention value (AV) and the minimal perceptible time (MPT) for display of subject matter associated with the AO.

27. A computing device as recited in claim 22, wherein each AO is a respective information block, and wherein the computer-program instructions further comprise instructions for:
representing the image (I) as a set of M×N evenly distributed information blocks $I_{ij}$ as follows:

$$I=\{I_{ij}\}=\{(AV_{ij}, r_{ij})\}, \; 1 \leq i \leq M, 1 \leq j \leq N, r_{ij} \in (0,1),$$

wherein (i, j) corresponds to a location at which the information block $I_{ij}$ is modeled according to a visual attention, $AV_{ij}$ is a visual attention value of $I_{ij}$, $r_{ij}$ is the spatial scale of $I_{ij}$, representing the minimal spatial resolution to keep $I_{ij}$ perceptible; and, generating the browsing path further by calculating an information fidelity ($f_{RSVP}$) for each AO as follows for respective ones of the information blocks $I_{ij}$:

$$f_{RSVP}(I, T) = \int_0^T \sum_{I_{ij} \in I_{RSVP}(t)} AV_{ij} u(r(t) - r_{ij}) dt, \; I_{RSVP}(t) \subseteq I; \text{ and}$$

wherein $I_{RSVP}(t)$ is a subset of the information blocks and varies with time and $$r(t) = \max_{I_{ij} \in I_{RSVP}(t)} r_{ij} \leq \min\left(\frac{Width_{Screen}}{Width_{I_{RSVP}(t)}}, \frac{Height_{Screen}}{Height_{I_{RSVP}(t)}}\right),$$

which varies with space.

28. A computing device as recited in claim 22, wherein the computer-program instructions further comprise instructions for optimizing the rate of information gain R either by maximizing information fidelity or by minimizing time cost.

29. A computing device as recited in claim 22, wherein the computer-program instructions further comprise instructions for optimizing the rate of information gain R in the shifting mode as follows:

$$\text{Given } T_P \leq \lambda_T, \; \max_P \{f_P(I, T_P)\},$$

wherein, $T_p$ represents a total amount of time spent for fixation and shifting in the browsing path P, $\lambda_T$ is a threshold of maximal time cost, and I represents the image.

30. A computing device as recited in claim 22, wherein the computer-program instructions further comprise instructions for optimizing the rate of information gain R in the shifting mode as follows:

$$\text{Given } f_P(I, T_P) \geq \lambda_{AV}, \; \min_P \{T_P\},$$

wherein, $T_p$ represents a total amount of time spent for fixation and shifting in the browsing path P, $\lambda_{AV}$ represents a minimal attention value or information percentage for attainment.

31. A computing device as recited in claim 22, further comprising:

detecting user intervention during automatic playback of the browsing path;

responsive to detecting the user intervention:
recording all AOs $S_r$ of the AOs that have not been browsed;
identifying all AOs $S_m$ of the AOs browsed during the user intervention;
regenerating the browsing path based on $S_r$-$S_m$; and
responsive to regenerating the browsing path and determining that there is at least a lull in user intervention, automatically navigating the browsing path.

32. A method comprising:

modeling an image with respect to multiple visual attentions to generate a respective set of attention objects (AOs) for each attention of the visual attentions;

analyzing the attention objects and corresponding attributes to optimize a rate of information gain as a function of information unit cost in terms of time associated with multiple image browsing modes; and responsive to analyzing the attention objects, generating a browsing path to select ones of the attention objects, the browsing path being a trade off of time for space or space for time;

wherein generating the browsing path further comprises creating the browsing path in view of a skimming image-browsing mode as follows:

splitting one or more large AOs of the AOs into smaller AOs;

combining AOs in close proximity to one another into one or more attention groups;

arranging the attention groups in decreasing order based on respective attention values;

for each attention group of the attention groups:
selecting the attention group as a starting point;
calculating a total browsing time and information fidelity for each path of all possible paths from the starting point; and
if the total browsing time is greater than a browsing time threshold, discarding the path;

selecting a non-discarded path having a largest information fidelity as the browsing path, the browsing path connecting each of the attention groups.

* * * * *